US011029004B2

(12) United States Patent
Kennedy et al.

(10) Patent No.: US 11,029,004 B2
(45) Date of Patent: Jun. 8, 2021

(54) NO WRAP STRAP FOR DECORATIVE CHRISTMAS LIGHTS

(71) Applicants: Stacy L. Kennedy, Mansfield, TX (US); John DeCosmo, Glenview, IL (US)

(72) Inventors: Stacy L. Kennedy, Mansfield, TX (US); John DeCosmo, Glenview, IL (US)

( * ) Notice: Subject to any disclaimer, the term of this patent is extended or adjusted under 35 U.S.C. 154(b) by 0 days.

(21) Appl. No.: 15/929,791

(22) Filed: May 21, 2020

(65) Prior Publication Data

US 2021/0063002 A1    Mar. 4, 2021

Related U.S. Application Data

(60) Provisional application No. 62/894,261, filed on Aug. 30, 2019.

(51) Int. Cl.
| | |
|---|---|
| *F21V 21/008* | (2006.01) |
| *F21V 21/08* | (2006.01) |
| *F21S 4/10* | (2016.01) |
| *F21W 121/04* | (2006.01) |

(52) U.S. Cl.
CPC .............. *F21V 21/008* (2013.01); *F21S 4/10* (2016.01); *F21V 21/0832* (2013.01); *F21W 2121/04* (2013.01)

(58) Field of Classification Search
CPC ............... F21V 21/008; F21V 21/0832; F21V 21/0816; F21S 4/10; F21S 4/22; F21W 2121/04; A47G 33/10
See application file for complete search history.

(56) References Cited

U.S. PATENT DOCUMENTS

| | | | | | |
|---|---|---|---|---|---|
| 2,722,317 | A | * | 11/1955 | Goodwin | F21S 4/20 211/89.01 |
| 4,244,014 | A | * | 1/1981 | Van Ess | F21V 21/0832 362/249.01 |
| 4,720,773 | A | * | 1/1988 | Ahroni | F21S 4/10 362/123 |
| 4,852,832 | A | * | 8/1989 | Delaney | F16L 3/08 248/65 |
| 4,870,547 | A | * | 9/1989 | Crucefix | F21S 4/10 362/123 |
| 5,119,528 | A |  | 6/1992 | Ono | |

(Continued)

FOREIGN PATENT DOCUMENTS

| | | |
|---|---|---|
| DE | 19716864 A1 | 11/1998 |
| GB | 2297580 A | 8/1996 |
| WO | WO 2014/189365 A1 | 11/2014 |

OTHER PUBLICATIONS

Extended European Search Report for European Patent Application No. 20193429.6, dated Dec. 9, 2020 (9 pages).

*Primary Examiner* — Peggy A Neils
(74) *Attorney, Agent, or Firm* — Nixon Peabody LLP

(57) ABSTRACT

A no wrap strap for a string of decorative lights including a plurality of apertures within a main body and a plurality of pairs of hanging hooks extending from the main body, with each pair of hanging hooks being disposed near a corresponding aperture. The no wrap strap further includes a securing element integrally attached to and extending from one end of the main body, the securing element including a plurality of securing balls arranged along a securing string.

7 Claims, 22 Drawing Sheets

(56) References Cited

U.S. PATENT DOCUMENTS

| | | | | |
|---|---|---|---|---|
| 5,752,682 A | * | 5/1998 | Anderson | H02G 3/26 |
| | | | | 248/316.7 |
| 6,050,701 A | * | 4/2000 | Stone | F21V 21/08 |
| | | | | 362/249.11 |
| 6,527,413 B1 | | 3/2003 | McIngvale | |
| 7,080,925 B1 | * | 7/2006 | Rushing | F21V 21/00 |
| | | | | 362/249.01 |
| 7,997,773 B2 | * | 8/2011 | Kraus | H02G 3/24 |
| | | | | 362/396 |
| 8,485,690 B1 | | 7/2013 | Garcia | |
| 2006/0213131 A1 | * | 9/2006 | Butzer | F21S 4/10 |
| | | | | 52/92.2 |
| 2007/0008724 A1 | | 1/2007 | Raska | |

* cited by examiner

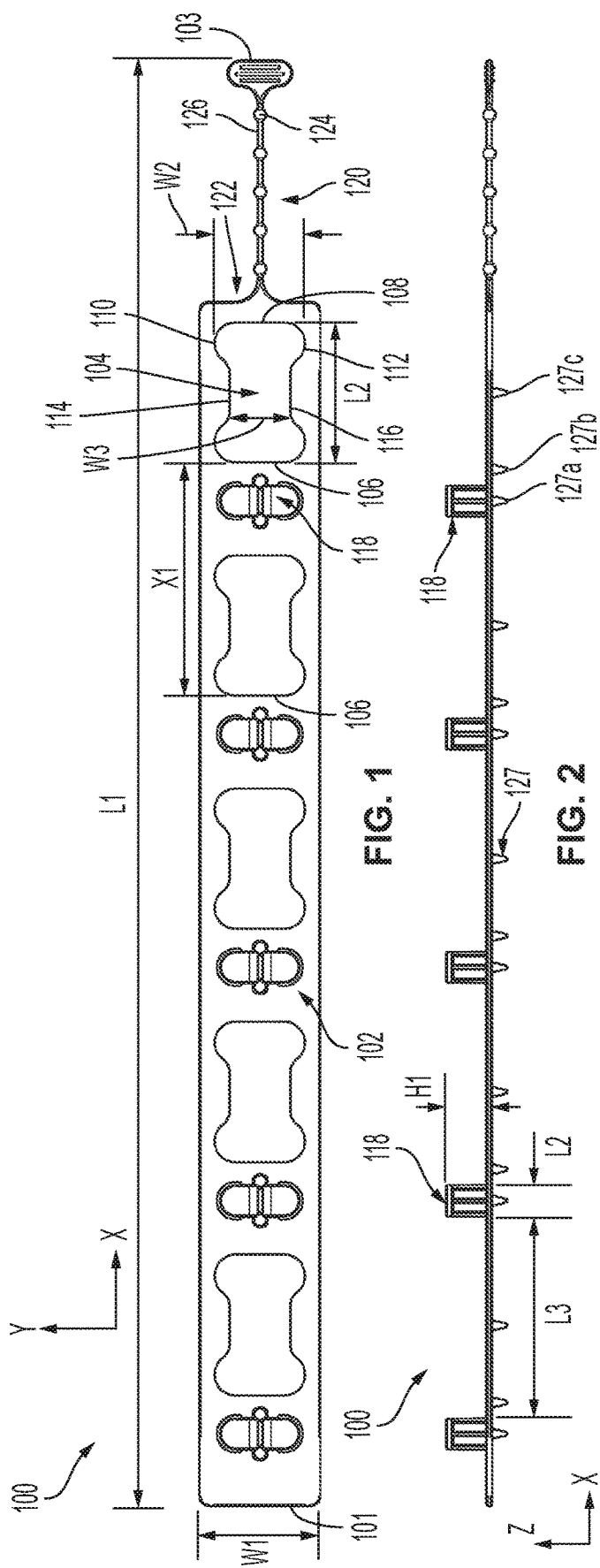
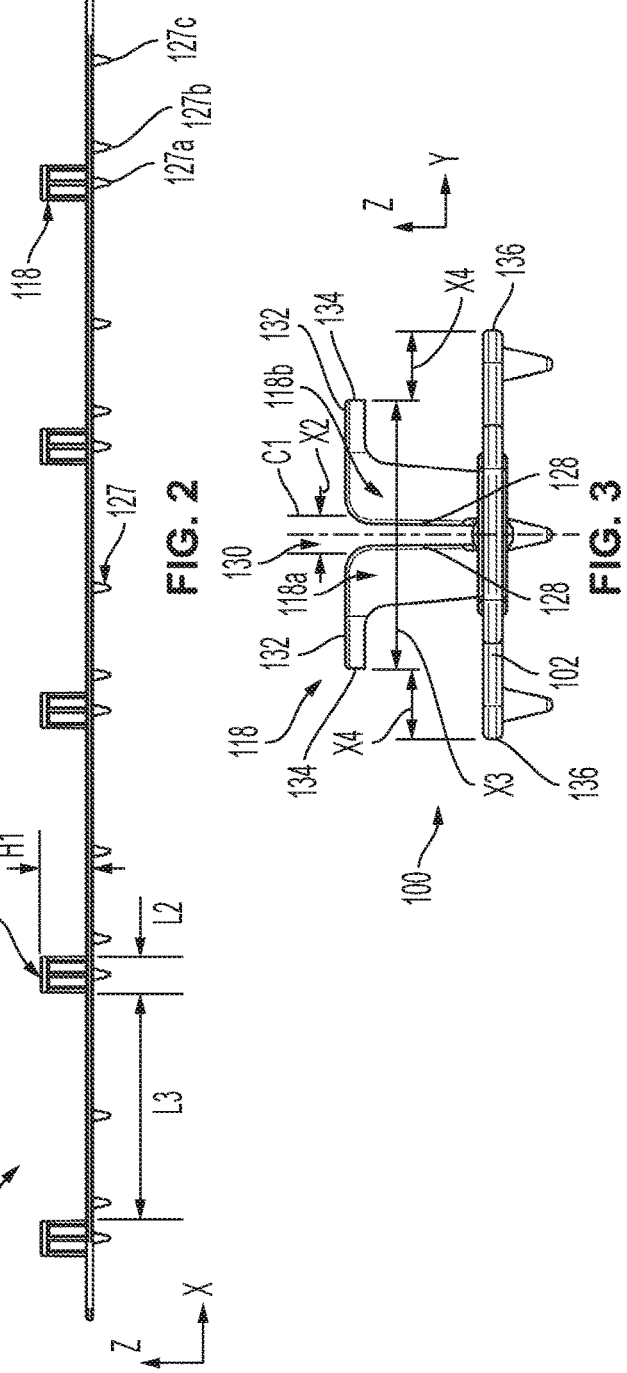
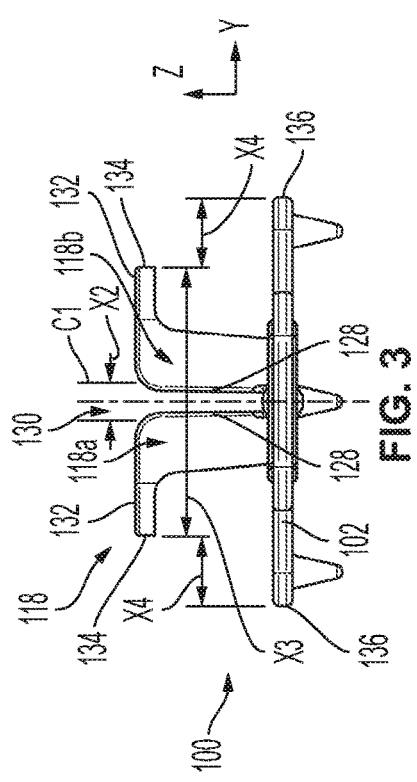
FIG. 1
FIG. 2
FIG. 3

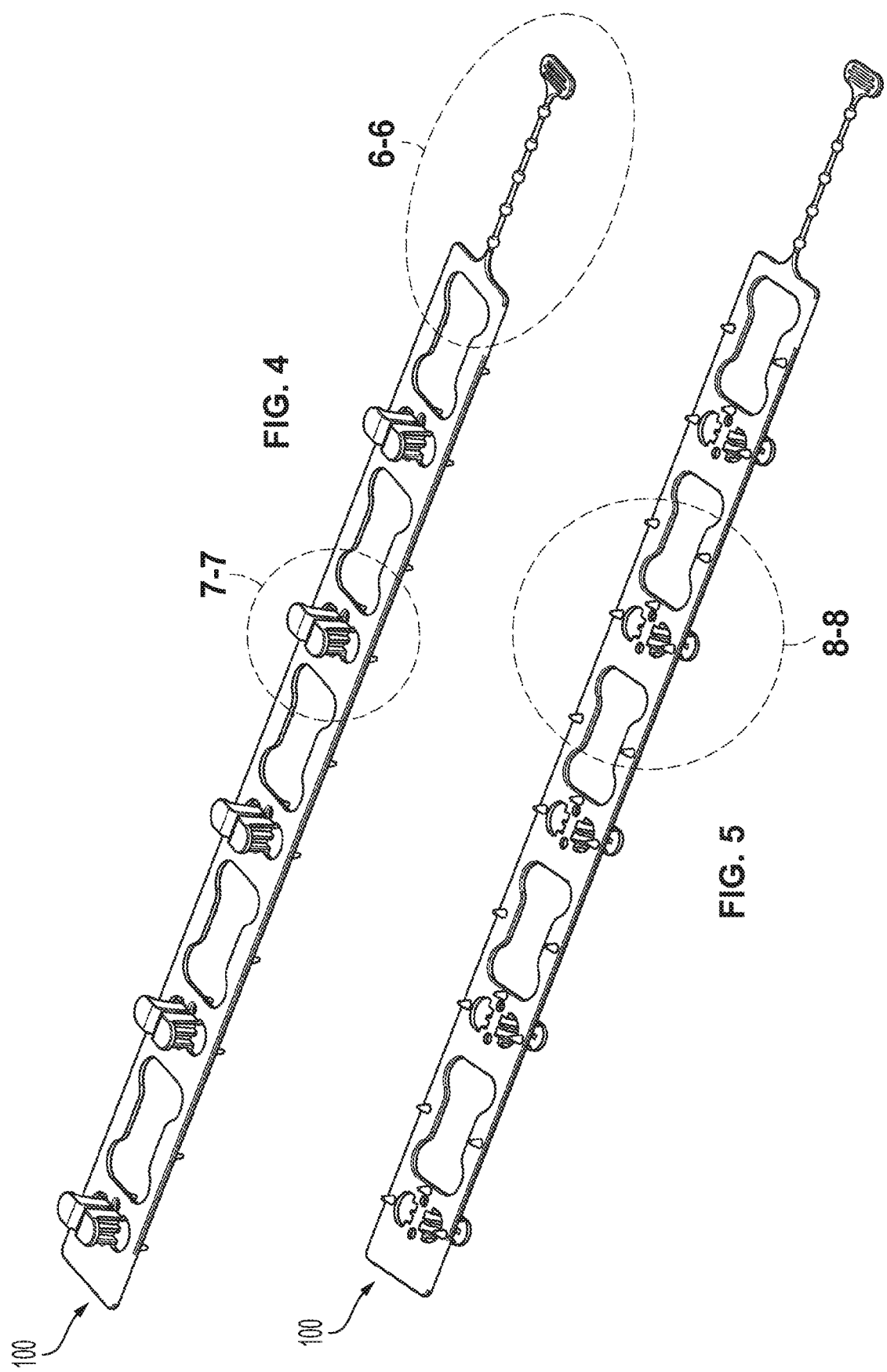

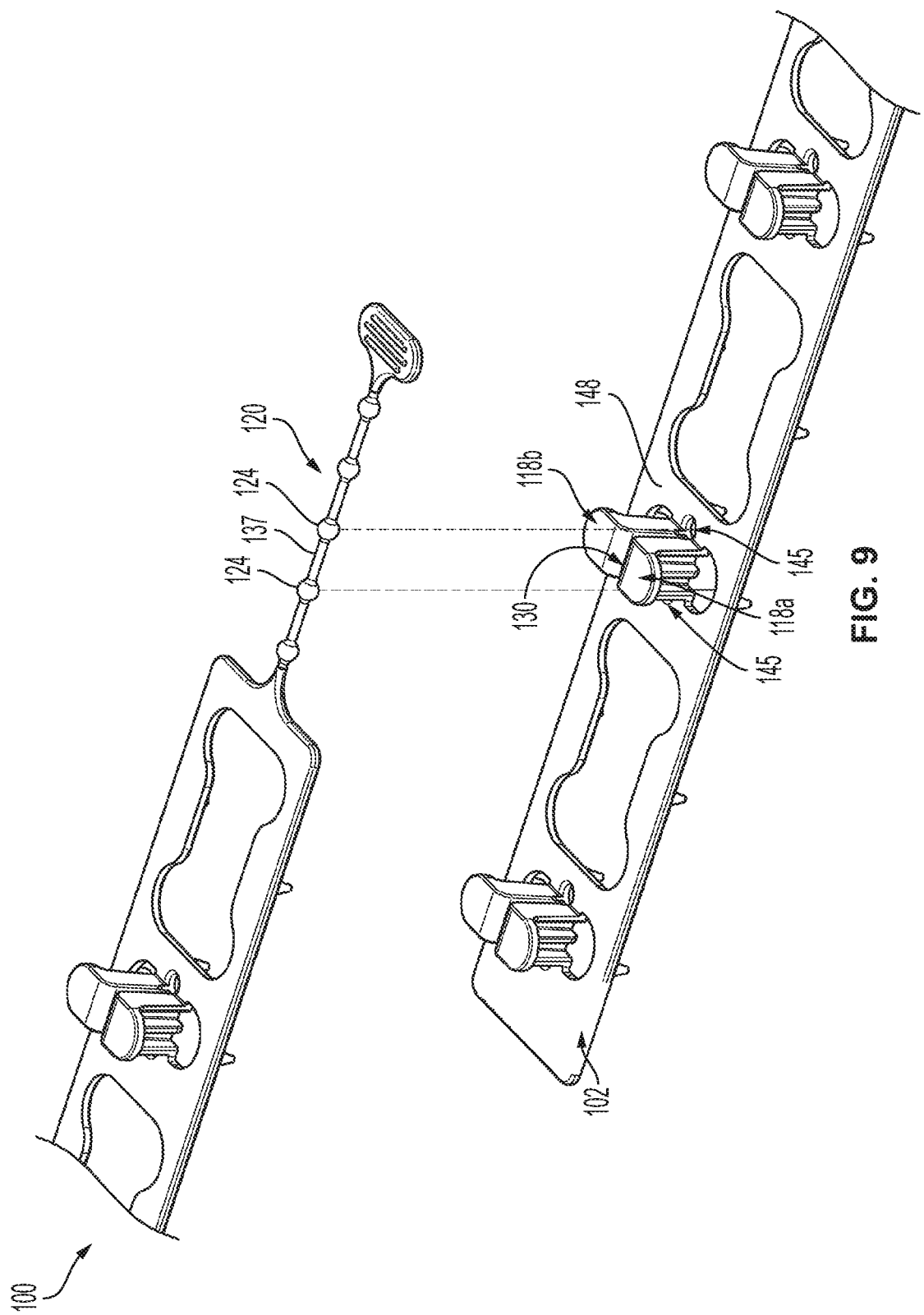

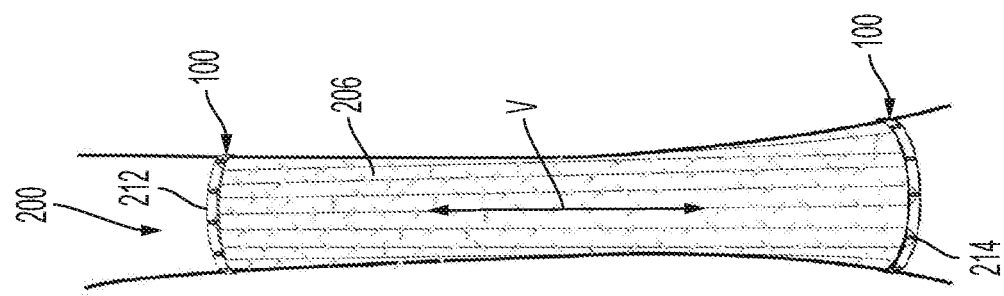
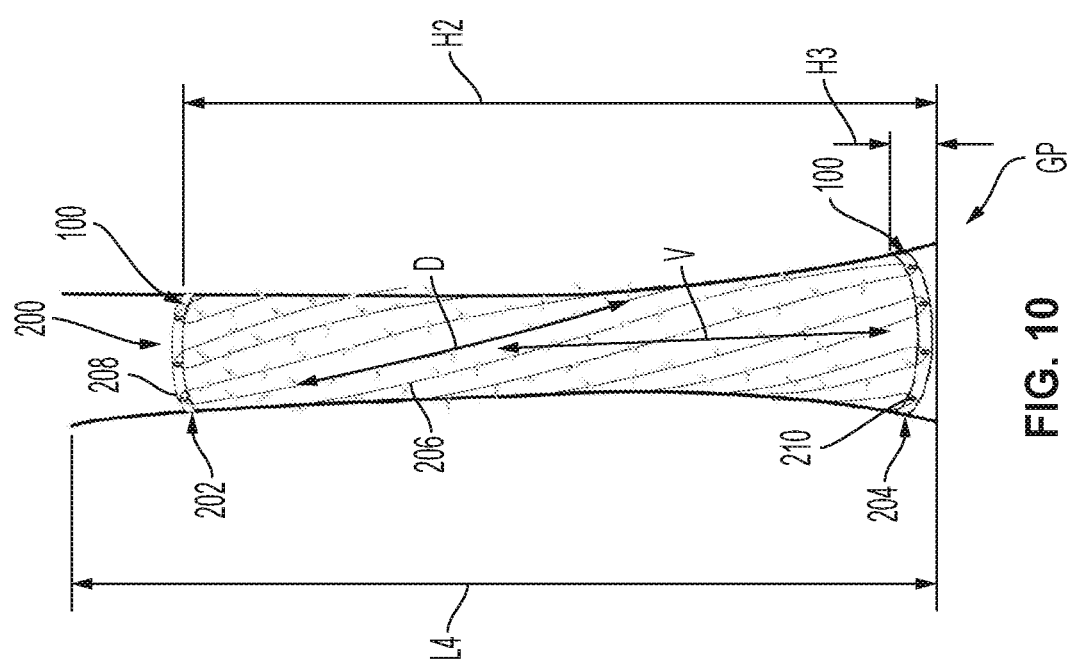

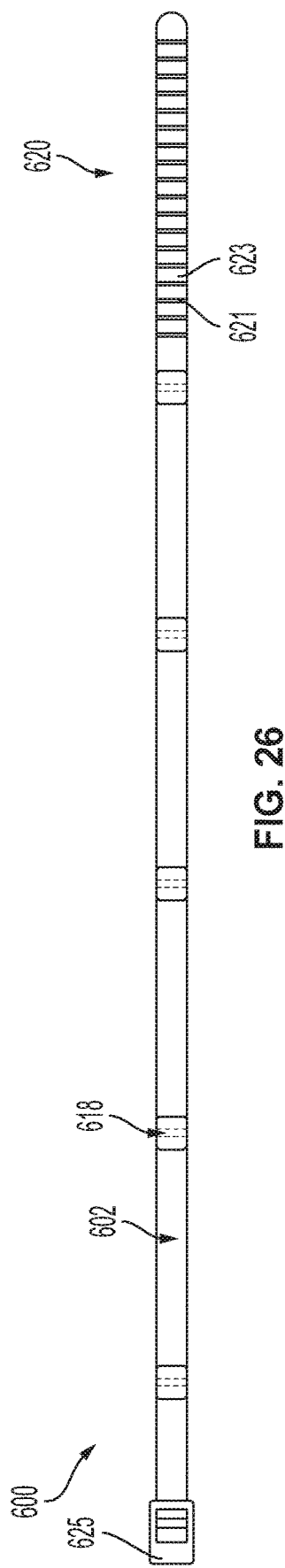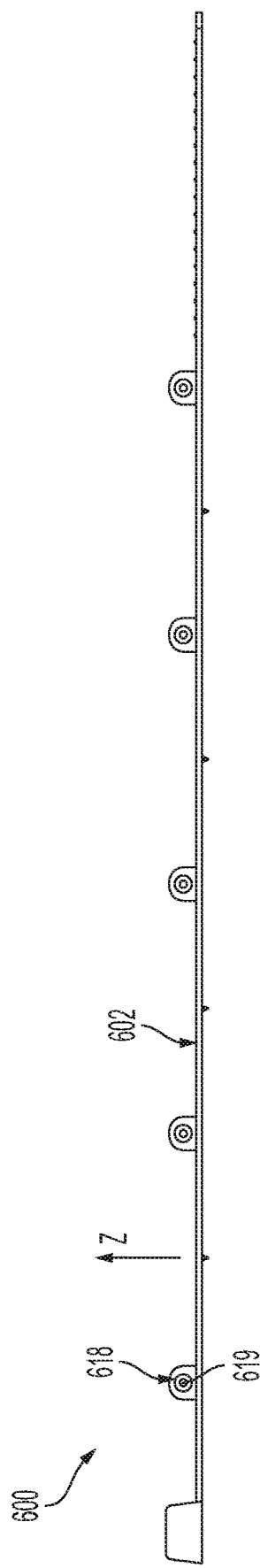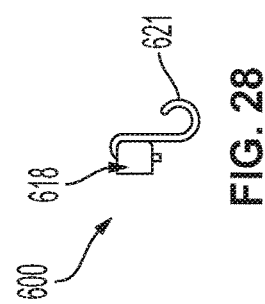
FIG. 26
FIG. 27
FIG. 28

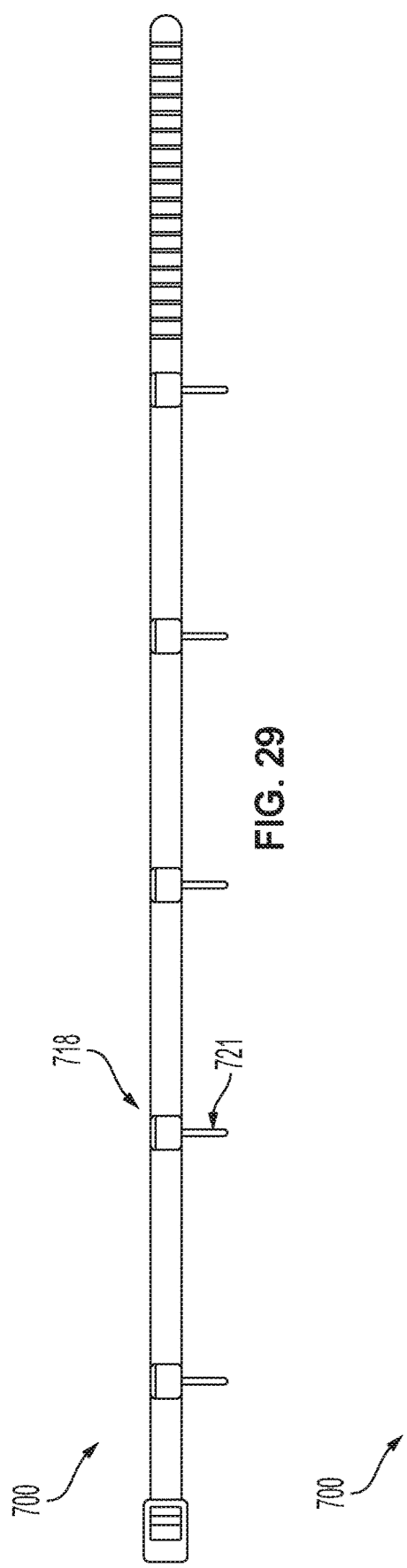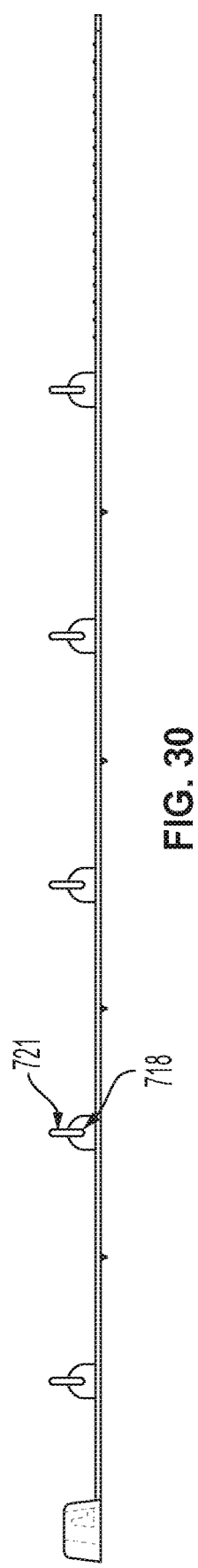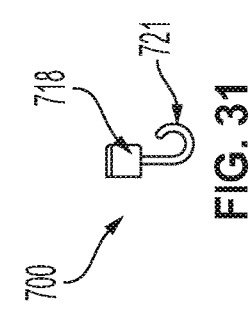

NO WRAP STRAP FOR DECORATIVE CHRISTMAS LIGHTS

CROSS-REFERENCE TO RELATED APPLICATIONS

This application claims priority to and the benefit of U.S. Provisional Patent Application Ser. No. 62/894,261, filed Aug. 30, 2019, which is incorporated herein by reference in its entirety.

FIELD OF THE INVENTION

The present invention relates generally to a strap for decorative Christmas lights, and, more specifically, to a strap for arranging Christmas lights in a straight, no wrap configuration.

BACKGROUND OF THE INVENTION

Typically, home owners and businesses enjoy wrapping decorative lights during special seasons (such as Christmas) around various objects, including trees and poles. The joy and entertainment aspects are tempered by the cost and process of installing and taking down the decorative lights. The cumbersome and tedious installation and removal of the decorative lights, which are typically wrapped around many trees and branches, translates in many cases into a large cost and time expenditure. For example, every year in October, before the Christmas season, a large U.S. city may require an estimated 1,000 hours for wrapping Christmas decorative lights around a large number of trees and poles along its main and side streets. This is a huge yearly investment.

Thus, there is a need for a device and method that will improve the above-stated and other problems, including reducing the time associated with installing and taking down Christmas decorative lights.

SUMMARY OF THE INVENTION

According to one aspect of the present disclosure, a no wrap strap for a string of decorative lights includes a main body, a plurality of apertures within the main body, and a plurality of pairs of hanging hooks extending from the main body. Each pair of hanging hooks of the plurality of pairs of hanging hooks is disposed near a corresponding aperture of the plurality of apertures. The no wrap strap further includes a securing element integrally attached to and extending from one end of the main body, the securing element including a plurality of securing balls arranged along a securing string.

According to another aspect of the present disclosure, a method is directed to holding light bulbs and includes providing a plurality of no wrap straps including a first strap and a second strap. Each strap of the plurality of no wrap straps has a plurality of pairs of hanging hooks extending from a main body, and a securing element integrally attached to and extending from the main body with a plurality of securing balls arranged along a securing string. The method further includes securing the first strap along a circumference of a tree or pole or other fixed structure by inserting the securing string in a recession between one of the plurality of pairs of hanging hooks such that two adjacent balls of the plurality of securing balls are outside the recession but next to the one of the plurality of pairs. The method also includes securing the second strap along the circumference of the tree or pole similar to the securing of the first strap, the second strap being spaced from the first strap along a length of the tree or pole. The method further includes arranging one or more string sections of a light string between the first strap and the second strap, each of the one or more string sections extending straight along the length of the tree or pole between the first strap and the second strap in a no wrap configuration.

According to yet another aspect of the present disclosure, a no wrap strap for a string of decorative lights includes a main body having a proximal end and a securing end. The no wrap strap further includes a securing element attached to the securing end of the main body and a plurality of repeating sections. Each section of the plurality of repeating sections includes an aperture having a shape defined by a periphery in which two longitudinal sides are connected to two outer sides. The two outer sides are connected to respective inner sides. Each one of the inner sides is in a central location of a respective one of the two outer sides. Each one of the inner sides is located closer to a central position of the aperture than a respective one of the two outer sides. Each section further includes a hanging hook positioned adjacent to the aperture, and a receiver positioned near the hook element. The receiver is configured to receive at least partially within the securing element.

Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 1 is a top view of a no wrap strap, according to one illustrative embodiment of the present disclosure.

FIG. 2 is a side view of the no wrap strap of FIG. 1.

FIG. 3 is a front view of the no wrap strap of FIG. 1.

FIG. 4 is a top perspective view of the no wrap strap of FIG. 1.

FIG. 5 is a bottom perspective view of the no wrap strap of FIG. 1.

FIG. 9 is perspective view illustrating alignment between opposing ends of the no wrap strap of FIG. 1.

FIG. 10 is a side view illustrating a vertical diagonal wrap, according to another illustrative embodiment of the present disclosure.

FIG. 11 is a side view illustrating vertical straight wrap, according to another illustrative embodiment of the present disclosure.

FIG. 26 is a top view of a no wrap strap having a hook configuration, according to another illustrative embodiment of the present disclosure.

FIG. 27 is a side view of the no wrap strap of FIG. 26.

FIG. 28 is a front view of the no wrap strap of FIG. 26.

FIG. 29 is a top view of a no wrap strap having a molded hook configuration, according to another illustrative embodiment of the present disclosure.

FIG. 30 is a side view of the no wrap strap of FIG. 29.

FIG. 31 is a front view of the no wrap strap of FIG. 29.

Figure 6:
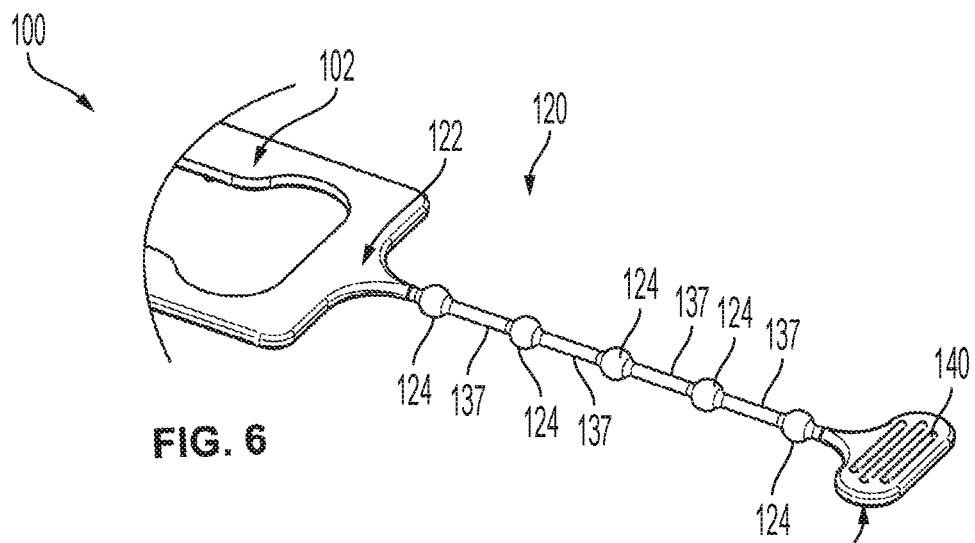
FIG. 6 is an enlarged view of a "6-6" portion of FIG. 4.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Various embodiments are described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Generally, the present disclosure describes and illustrates a strap for holding a string of decorative lights. The strap is also referred to as a no wrap strap because it helps in decorating light strings in a no wrap configuration. In other words, the decorative light strings do not have to be wrapped around a decorative element. Instead, the no wrap strap helps in decorating the light strings in a straight (e.g., up-down) configuration that avoids cumbersome wrapping.

The decorative element can be, for example, a tree, a pole, a column, etc. According to further examples, the column can be a stone column, a brick column, etc. According to further examples, the decorative element has various profiles (or cross-sectional shape), including a round profile, a square profile, a rectangular profile, etc. Thus the no wrap strap can be attached (or installed) on skinny poles, trees of all sizes, wide columns, other fixed structures, and everything in-between.

The no wrap strap is configured to be attached around any diameter size of a tree, pole, or other fixed structure or decorative element. For example, according to one example the no wrap strap has a specific length that is sufficient to attach to the desired diameter size. According to another example, the no wrap strap is modular such that it can attach to one or more other no wrap straps in a modular fashion until the decorative element is completely encompassed. Accordingly, the no wrap strap of the present disclosure has the ability to accommodate any size diameter using one or more individual no wrap straps that are attached to themselves or to other no wrap straps.

The strap includes a main body, a plurality of apertures, a plurality of pairs of hanging hooks, and a securing element. According to one example, the main body is in the form of a rectangular band of plastic material. Optionally, the main body has a rectangular shape that is approximately 18 inches in length and about 1.5 inches in width.

The plurality of apertures are positioned within the main body, with each aperture being centered along a width of the main body and equidistant from adjacent apertures. Each aperture has a first side that is spaced from an opposite second side along a length of the main body. According to an illustrated example, which shows a total of five apertures, a first side of one aperture is positioned approximately 2.9 inches from another first side of an adjacent aperture.

The plurality of pairs of hanging hooks are positioned within and extending from the main body, with each pair of hanging hooks being symmetrically centered along the width of the main body and equidistant from adjacent pairs of hanging hooks. Each pair of hanging hooks is interposed in-between two adjacent apertures, optionally being closer to the first side of an adjacent aperture than to the second side of another adjacent aperture. Each pair of hanging hooks is separated by a centered recession, which generally divides a first hook from a second hook.

The securing element is integrally attached to and extends from one end of the main body, and includes a plurality of securing balls that are arranged along a securing string. A securing tab is positioned at a terminating end of the securing string. A portion of the securing string is configured for being inserted and received within the recession between any of the pairs of hanging hooks, securing longitudinally the securing element by having two adjacent securing balls outside the recession but near opposing sides of the respective pair of hanging hooks.

According to one example, the securing element secures the strap to itself around a tree or pole that has a circumference sufficiently small for allowing the strap to wrap around. According to another example, the securing element secures the strap to another strap, which is similar or identical to the strap. In other words, a first strap is secured to a second strap via a first securing element of the first strap that is inserted in a second recession between a second pair of hanging hooks of the second strap.

According to another embodiment, the strap is in the form of a rectangular plastic band, without apertures, that wraps around a tree diameter and is secured to the tree by securing two strap ends together. Hanging hooks, that are optionally made of metal, are removably affixed to the strap for facilitating a hanging point for the light string.

One benefit of the strap is that it facilitates arranging a decorative set of lights, such as Christmas-tree lights or other holiday lights, in the straight, no wrap configuration. In other words, the strap itself wraps around a tree but the lights string is not wrapped, instead being arranged in the straight configuration along a tree length. For example, one or more first straps are secured at a low height of a tree by wrapping the first straps along the diameter of the tree at that low height. One or more second straps are secured at a high height of the tree by wrapping the second straps along the diameter of the tree at that high height, which is higher than the low height.

After securing the first and second straps to the tree, a light string is arranged in straight configuration between respective hanging hooks of the first and second straps. The straight configuration is also referred to as a no wrap, an up-down, or north-south configuration, which is distinguished from and advantageous over a wrap configuration in which the light string wraps around the circumference of the tree. Thus, while prior devices and methods require the light string to wrap around a tree, the present strap and method facilitate the light string to run along (not around) the tree.

To hold light bulbs of a light string along a tree, pole, or other decorative element, a plurality of straps are provided to a user. The plurality of straps include a first strap and a second strap, with each strap being configured in accordance with any of the described and illustrated examples of this disclosure. For ease of understanding, it is assumed that a single strap is sufficiently long to encircle the respective tree or other decorative element. However, it is understood that each strap can be secured to another strap to accommodate an appropriate circumference.

The first strap is secured around the circumference of the tree by inserting the securing string in a recession between one of the pairs of hanging hooks such that two adjacent securing balls are outside the recession and next to one of the plurality of pairs of hanging hooks. The recession is selected to ensure sufficient tightness between the first strap and the tree circumference. The second strap is similarly secured around the circumference of the tree but spaced from the first strap along the tree length.

After the first and second straps are secured around the tree circumference, the light string is hooked straight along the tree length between the first and seconds traps in the no wrap configuration. The no wrap configuration facilitates ease of installation and taking down of the light string, reducing time and money associated with typical reoccurring seasonal tasks.

Referring generally to FIGS. 1-9, a strap 100 (also referred to as a no wrap strap) is configured to attaching a string of decorative lights to a decorative structure, such as a tree or a pole. Referring more specifically to FIG. 1, the strap 100 is generally defined by a length L1 and a width W1. The length L1 extends generally along an X axis and the width extends generally along a Y axis. According to one example, the length L1 is about 18.40 inches and the width W1 is about 1.50 inches. The length L extends between a proximal end 101 and a distal end 103.

The strap 100 includes a main body 102 and a plurality of apertures 104 located within the main body 102. According to the illustrated example, the main body 102 is in the form of a rectangular band. In other embodiments, the main body 102 has different shapes than the rectangular band. According to the illustrated example, the strap 100 includes five apertures 104. In other embodiments, the strap 100 includes a different number of apertures 104. Optionally, the main body 102 is made from a plastic material.

According to the illustrated example, the apertures 104 are generally identical to each other, with each aperture 104 having a bone shape. Each aperture 104 has a length L2 that extends between opposing first and second ends 106, 108, and width W2 that extends between first and second outer sides 110, 112. According to an exemplary configuration, a distance X1 between a first end 106 of a first aperture 104a and a first end 106 of a second aperture 104b is approximately 2.90 inches. In other words, the distance X1 is measured between respective first ends 106 of the two adjacent apertures 104a, 104b. Optionally, the apertures 104 are at equidistant positions from each other along the length L1. Each aperture 104 further has first and second inner sides 114, 116 separated by a width W3. According to other embodiments, the apertures 104 are different from each other and have other shapes.

The strap 100 further includes a plurality of pairs of hanging hooks 118, each pair 118 being disposed near one or more corresponding apertures 104. The strap 100 further includes a securing element 120 that is integrally attached to and extends from a securing end 122 of the main body 102. The securing element 120 has a plurality of securing balls 124 that are arranged along a securing string 126

One or more of the components described above form a repeating section that is replicated throughout the main body 102 of the strap 100. For example, each repeating section includes one aperture 104 and an adjacent pair of hooks 118. In alternative embodiments, each repeating section may include additional components, such as a tie receiver 325 (illustrated in FIG. 20) and may be separated along a separating line, such as a trim line 337 (illustrated in FIG. 20).

Referring more specifically to FIG. 2, each pair of hanging hooks 118 has a length L2 and a height H1. Each pair of hanging hooks 118 is separated from an adjacent pair of hanging hooks 118 by a distance L3. According to the illustrated embodiment, the distance L3 is the same between each adjacent pair of hanging hooks 118. In alternative embodiments, the distance L3 varies between adjacent pairs of hanging hooks 118.

The strap 100 further includes a plurality of spikes 127 that extend from the main body 102 along a Z axis. The spikes 127 are spaced in a uniform configuration along the main body 102, with a repeating pattern of spikes 127a-127c aligned with a respective pair of hanging hooks 118. The spikes 127 are optional, as illustrated in the exemplary embodiment of FIGS. 41-44 described below. Although the spikes 127 are beneficial when attaching the strap 100, for example, to bark of a tree, the spikes 127 are not necessary when attaching the strap 100, for example, to a cement pole. Thus, the spikes 127 are not included in some embodiments.

Referring more specifically to FIG. 3, each pair of hanging hooks 118 includes a first hook 118a and a second hook 118b. Each hook 118a, 118b extends from the main body 102 along the Z axis, having an inner side 128 that extends generally parallel to the Z axis. Both hooks 118a, 118b are offset from a center line C1, being symmetrically positioned relative to the Z axis along the main body 102. As such, the hooks 118a, 118b are separated by a centered recession 130 having a distance X2 along the Y axis. In alternative examples, the hooks 118a, 118b are positioned in a non-symmetrical orientation relative to the Z axis.

Each hook 118a, 118b has a top side 132 extending generally perpendicular from the inner side 128. The top side 132 terminates in a top end 134. The distance from the top end 134 of the first hook 118a to the top end 134 of the second hook 118b is an overall hook distance X3. According to the illustrated embodiment, the overall hook distance X3 is approximately the same as the width W2 of the apertures 104. The top end 134 is separated along the Y axis from an external side 136 of the main body 102 by an edge distance X4.

Referring more specifically to FIG. 6, the securing element 120 extends from and is integral with the securing end 122 of the main body 102. The security balls 124 are interspersed with securing segments 137 of the securing string 126, which ends in a terminating end 138. According to the illustrated embodiment, the terminating end 138 is in the form of a generally rectangular tab having a plurality of retaining ridges 140. According to other embodiments, the terminating end 138 has a different form and/or shape.

The securing balls 124 are positioned at equidistant positions along the securing string 126. However, in alternative embodiments the securing balls 124 are positioned at varying positions along the securing string 126. The securing balls 124 are in the shape of spheres. However, in alternative embodiments the securing balls 124 have different and various shapes.

Figure 7:
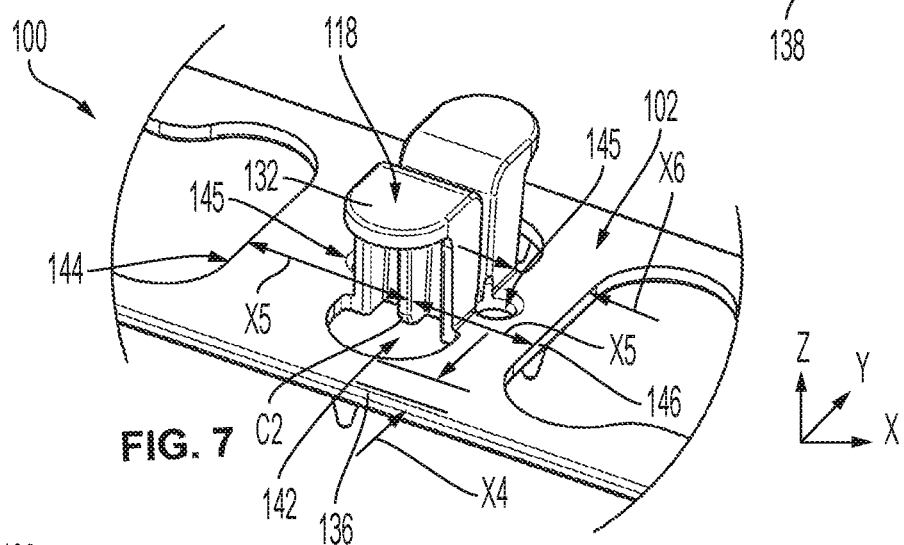
FIG. 7 is an enlarged view of a "7-7" portion of FIG. 4.

Referring more specifically to FIG. 7, each hook 118 has a hook cutout 142 that extends through the main body 102. The hook cutout 142 has a semi-circular shape that is similar to the top side 132. The hook cutout 142 is separated from the external side 136 of the main body 102 by the edge distance X4.

Each pair of hooks 118 that is positioned between adjacent apertures 104 is located equidistant from both of the adjacent apertures 104. Specifically, a distance X5 separates a center point C2 of the pair of hooks 118 from each adjacent edge 144, 146 of the apertures 104. Although in this embodiment, the distance X5 is the same relative to each adjacent edge 144, 146, in alternative embodiments the distance X5 is different relative to each adjacent edge 144, 146.

The main body 102 further has two holes 145 (also shown in FIG. 8) located near the base of each hook 118. Each hole 145 is positioned along the X axis adjacent to the hooks 118, and extending towards the adjacent edge 146. Each hole 145 is separated from the adjacent edge 146 by a distance X6.

Figure 8:
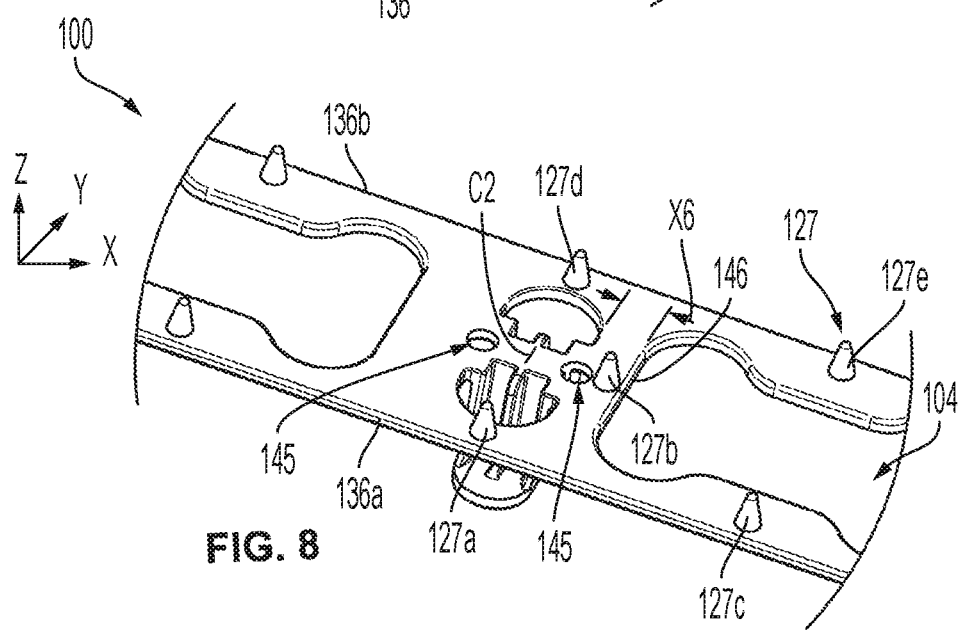
FIG. 8 is an enlarged view of a "8-8" portion of FIG. 5.

Referring more specifically to FIG. 8, each pattern of spikes 127 includes five spikes 127a-127e. A first spike 127a is positioned (relative to the X axis) along the center point C2 near a first external side 136a. A second spike 127b is positioned (relative to the Y axis) centered between the first external side 136a and a second external side 136b, near the adjacent edge 146. A third spike 127c is positioned (relative to the X axis) near a center point of the aperture 104 and next to the first external side 136a (relative to the Y axis). A fourth spike 127d is generally symmetrical with the first spike 127a relative to the X axis. Thus, the fourth spike 127d is positioned (relative to the X axis) along the center point C2 near the second external side 136b. A fifth spike 127e is generally symmetrical with the third spike 127c relative to the X axis. Thus, the fifth spike 127e is positioned (relative to the X axis) near a center point of the aperture 104 and next to the second external side 136b (relative to the Y axis). Each spike 127 has a generally triangular shape. In alternative embodiments, the spikes 127 are arranged in various patterns and have different shapes.

Referring more specifically to FIG. 9, the securing element 120 is configured to be temporarily fixed between a desired pair of hooks 118a, 118b. When attached, a desired securing segment 137 is inserted through the centered recession 130 until it comes near to or in contact with a top planar surface 148 of the main body 102. The securing balls 124 that are positioned at respective ends of the desired securing segment 137 are received respectively in the holes 145. Optionally, one or more of the securing segment 137 and the securing balls 124 are fixed via a pressed-fit or snap-fit configuration. For example, the securing segment 137 is optionally pressed in the centered recession 130 until it is held in place by frictional contact with the hooks 118a, 118b. Similarly, the securing balls 124 are pressed in to the holes 145 until they are snapped into place, in response to the holes 145 having a slightly smaller size than the securing balls 124.

Referring generally to FIGS. 10-16, the strap 100 is used to form a decorative supporting structure for hanging a light string around a decorative element 200. For illustrative purposes, the decorative element 200 is in the form of a tree. However, in other embodiments, the decorative element 200 is in other forms, such as poles, pillars, etc.

Referring more specifically to FIG. 10, one or more straps 100 form a top support 202, by fixing the strap 100 to itself (as discussed above in reference to FIG. 9, or to a different strap 100. Based on a circumference of the decorative element 200, any number of straps 100 are used to completely encircle the decorative element 200. The top support 202 is positioned at a height H2 relative to a ground plane GP.

Similarly, one or more straps 100 form a bottom support 204 to completely encircle the decorative element 200. The bottom support 204 is positioned at a height H3 relative to the ground plane GP. The height H3 of the bottom support 204 is lower than the height H2 of the top support 202. Thus, the bottom support 204 is spaced from the top support 202 along a length L4 of the decorative element 200.

In the illustrated embodiment of FIG. 10, a light string 206 is arranged in a diagonal direction D to achieve a vertical diagonal wrap arrangement. This arrangement is achieved by having a top attachment 208 of the light string 206 being offset from a sequential bottom attachment 210 of the light string 206, relative to a vertical direction V.

Referring now specifically to FIG. 11, the light string 206 is arranged in the vertical direction V to achieve a vertical straight wrap arrangement. This arrangement is achieved by having a top attachment 212 of the light string 206 being vertically aligned with a sequential bottom attachment 214 of the light string 206, along the vertical direction V.

Figure 12:
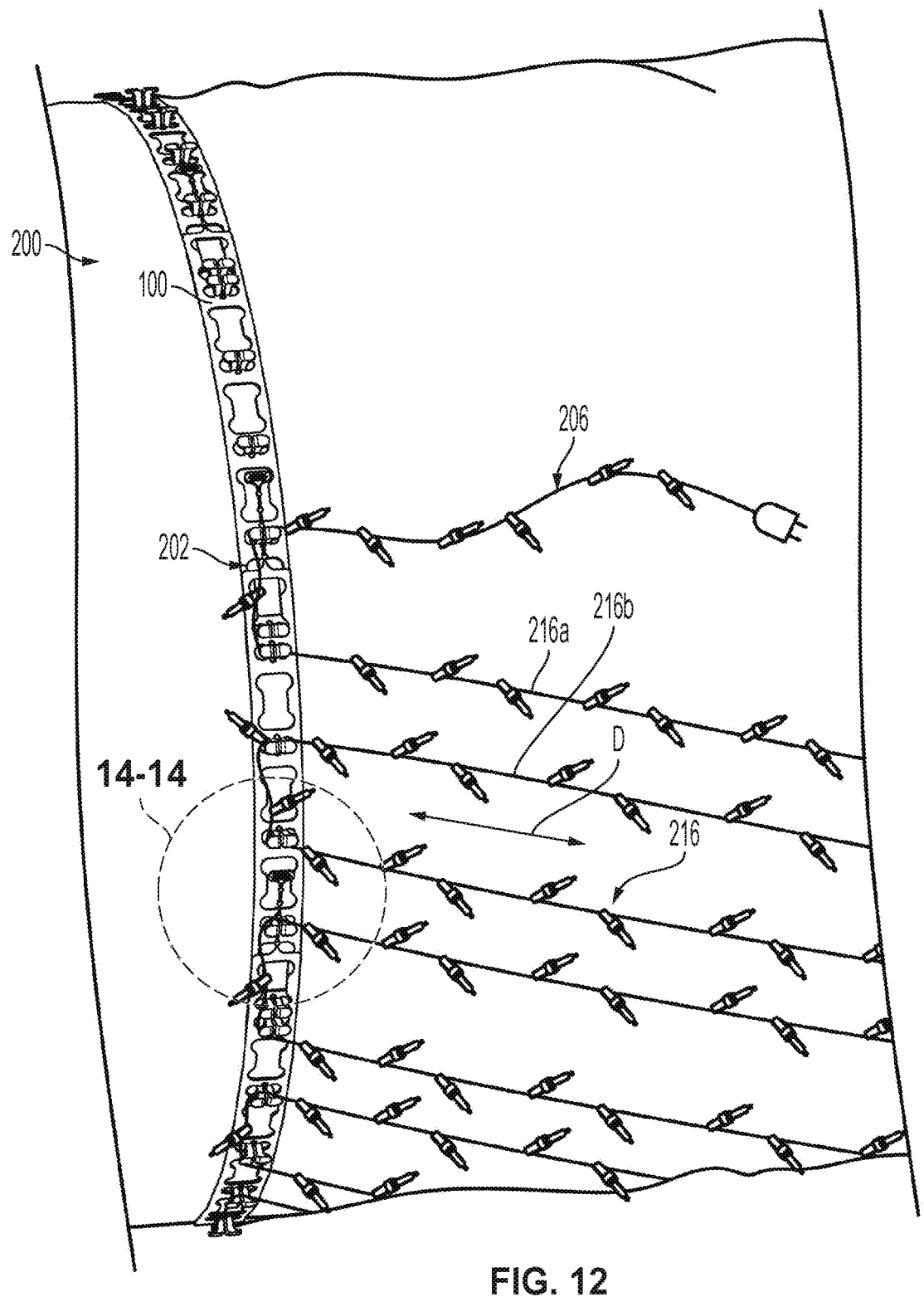
FIG. 12 is a top portion of the vertical diagonal wrap of FIG. 10.

Referring now specifically to FIG. 12, the light string 206 is wrapped around the top support 202 to form parallel diagonal string sections 216. The string sections 216 include a plurality of sections, including a first string section 216a and a second string section 216b. In this example, the string sections 216 are aligned with the diagonal direction D.

Figure 13:
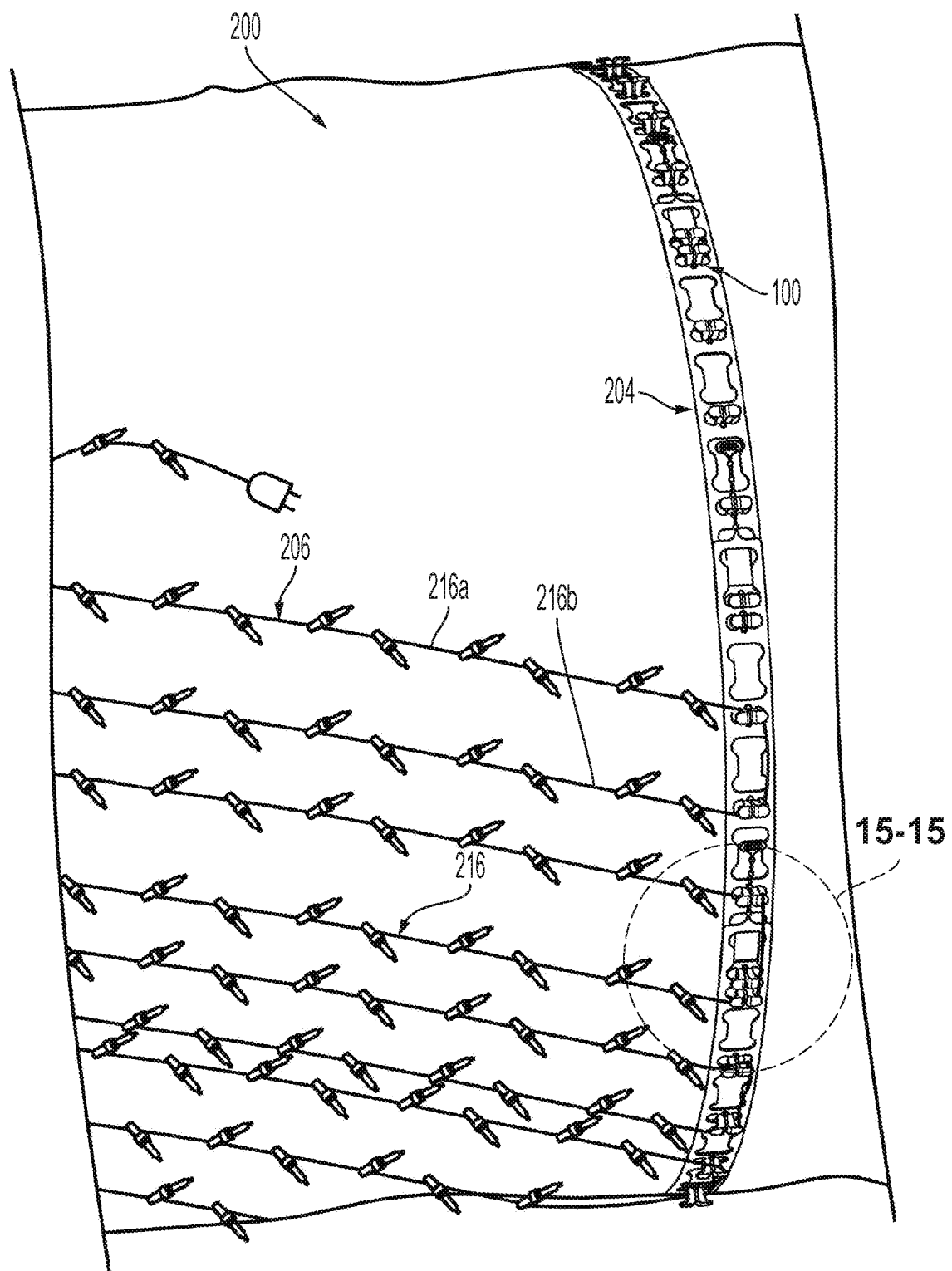
FIG. 13 is a bottom portion of the vertical diagonal wrap of FIG. 10.

Referring now specifically to FIG. 13, the light string 206 is wrapped around the bottom support 204 to form the parallel diagonal string sections 216. The bottom support 204 cooperates in conjunction with the top support 202 for forming the parallel diagonal string sections 216.

Figure 14:
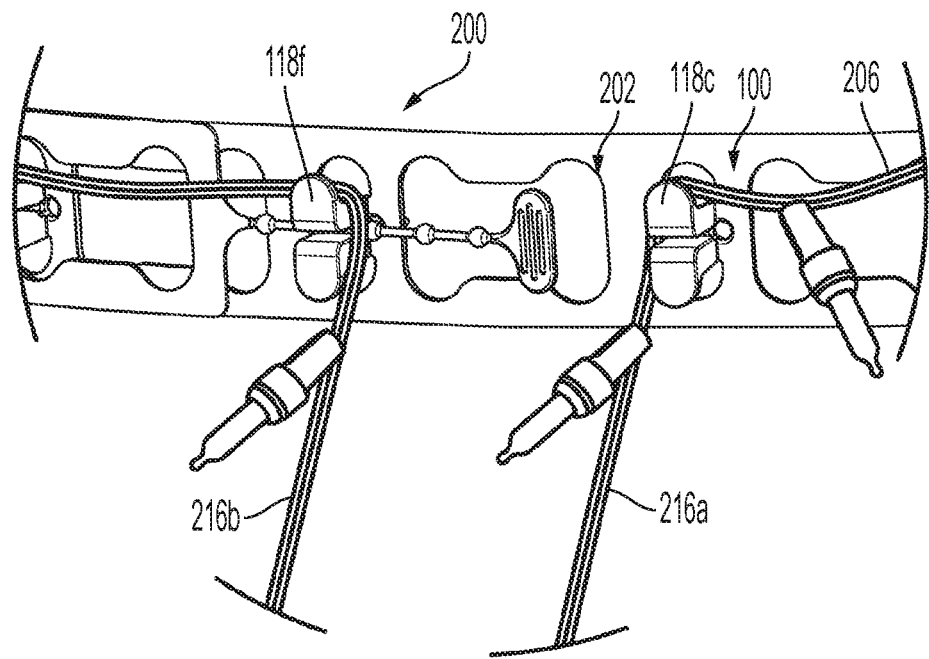
FIG. 14 is an enlarged view of a "14-14" portion of FIG. 12.
Figure 15:
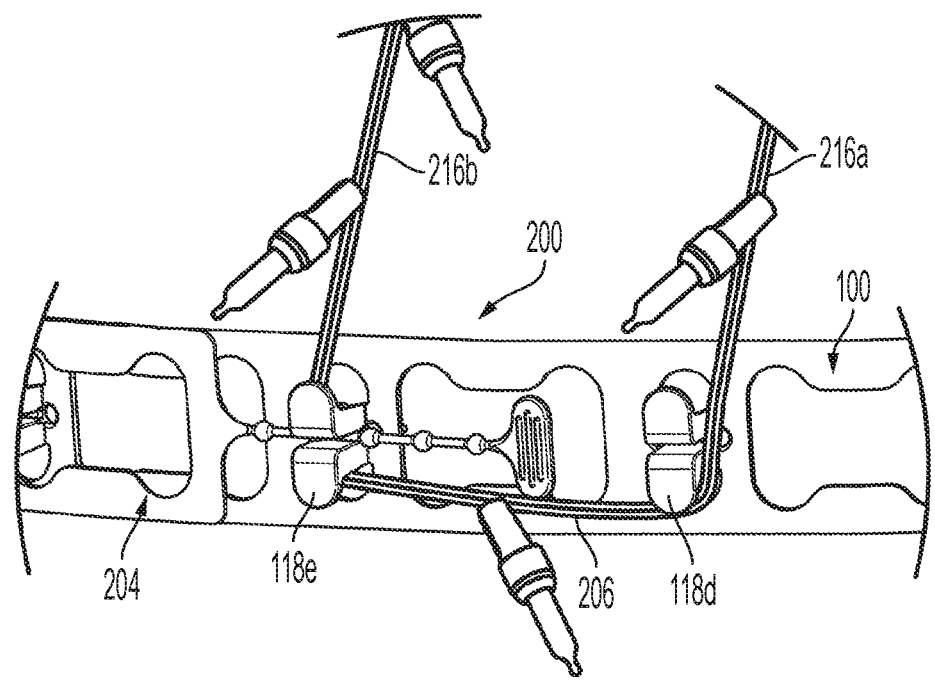
FIG. 15 is an enlarged view of a "15-15" portion of FIG. 13.

Referring now specifically to FIGS. 14 and 15, the light string 206 is wrapped around a top right hook 118c (shown in FIG. 14), then wrapped around a bottom right hook 118d (shown in FIG. 15), then wrapped around a bottom left hook 118e (shown in FIG. 15), and then wrapped around a top left hook 118f (shown in FIG. 14). The top right hook 118c and the top left hook 118f are part of the top support 202 (shown in FIG. 14). The bottom right hook 118d and the bottom left hook 118e are part of the bottom support 204 (shown in FIG. 15). The first string section 216a is formed between the top right hook 118c (shown in FIG. 14) and the bottom right hook 118d (shown in FIG. 15). The second string section 216b is formed between the bottom left hook 118e (shown in FIG. 15) and the top left hook 118e (shown in FIG. 14). Although the above arrangement was described in a right-to-left configuration, the same arrangement can be achieved using a left-to-right configuration.

Figure 16:
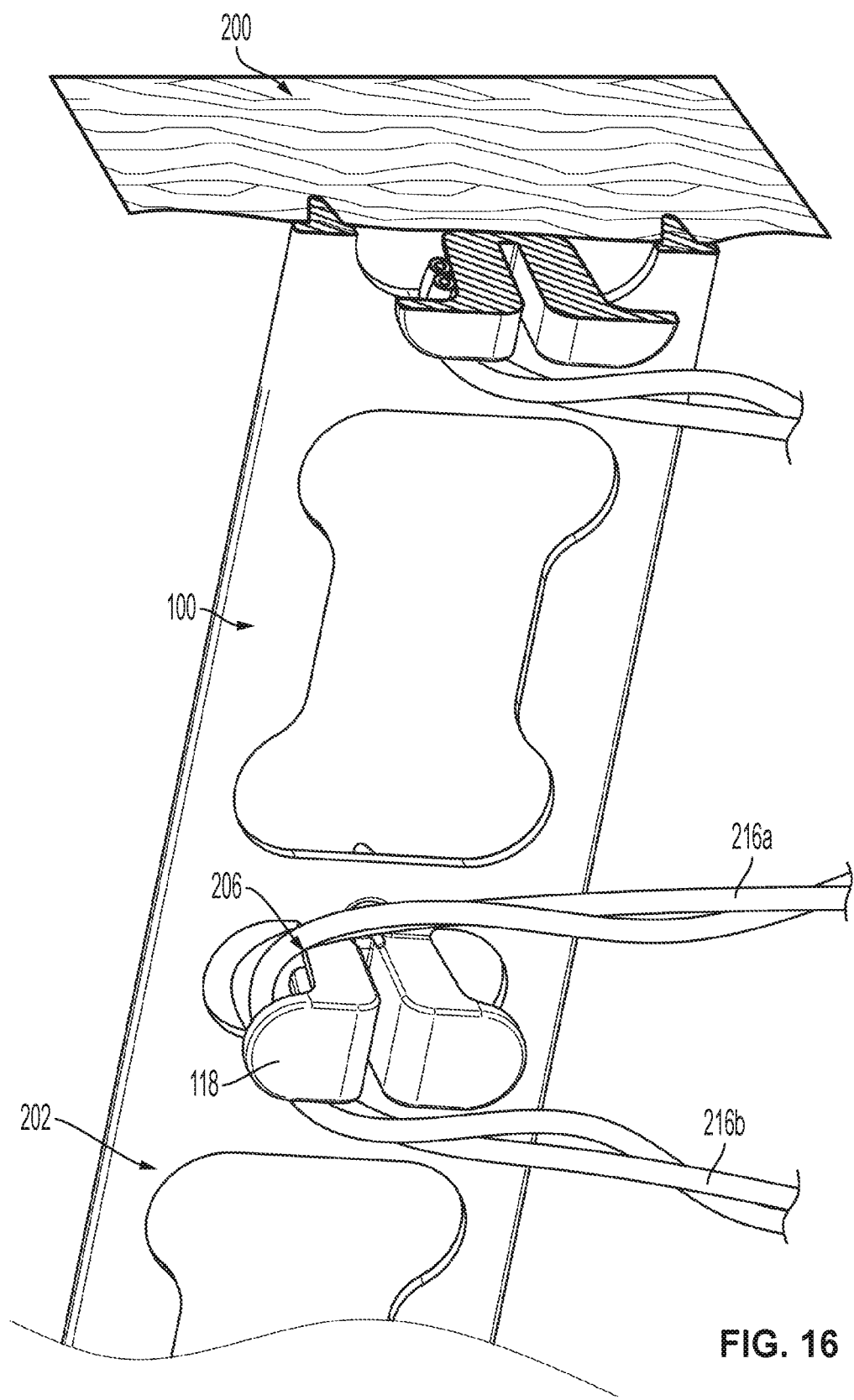
FIG. 16 is a perspective view illustrating a light string arranged around a top no wrap strap.

Referring now specifically to FIG. 16, the light string 206 is wrapped such that the first and second string sections 216a, 216b are formed by a single hook 118 in the top support 202. This arrangement is in contrast to the wrapping arrangement illustrated in FIG. 14 in which the first and second string sections 216a, 216b were achieved using a plurality of adjacent hooks, e.g., top right and left hooks 118c, 118f. Similarly, although not shown, a single one of hooks 118d, 118e (shown in FIG. 15) can be used from the bottom support 204 (shown in FIG. 15) to form the first and second string sections 216a, 216b.

Referring generally to FIGS. 17-20, a strap 300 is provided in the form of a zip tie overlap configuration, according to an alternative embodiment of the present disclosure. The zip tie overlap strap 300 is generally similar, but not identical, to the strap 100 described above in reference to FIGS. 1-16. For example, the zip tie overlap strap 300 can have one or more of the features discussed above, except as disclosed below.

Figure 17:
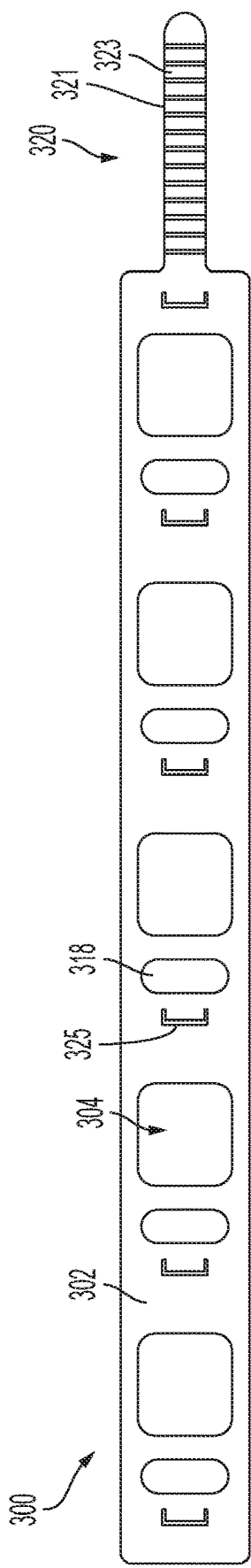
FIG. 17 is a top view of a no wrap strap having a zip tie overlap configuration, according to another illustrative embodiment of the present disclosure.

Referring specifically to FIG. 17, the zip tie overlap strap 300 has a securing element 320 that is in the form of a zip tie. The zip tie 320 has a plurality of ribs 321 interspersed with a plurality of separating areas 323, thus forming a ribbed strap. The strap 300 includes a plurality of tie receivers 325 configured for securing the zip tie 320. The tie receivers 325 are located on a main body 302 between respective hooks 318 and apertures 304. According to one example, the tie receivers 325 are in the form of receiving slots formed within the main body 302.

Figure 18:
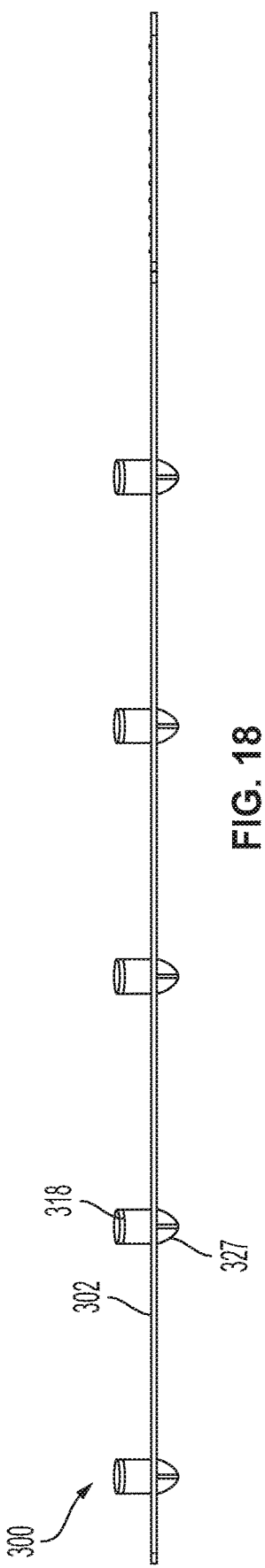
FIG. 18 is a side view of the no wrap strap of FIG. 17.

Referring specifically to FIG. 18, the strap 300 further has a plurality of spikes 327 that are generally aligned with hooks 318. The spikes 327 extend from the main body 302 in an opposite direction than the hooks 318.

Figure 19:
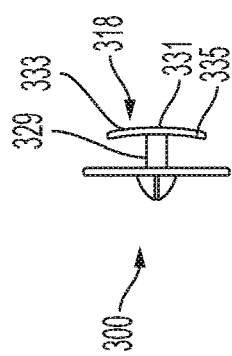
FIG. 19 is a front view of the no wrap strap of FIG. 18.

Referring specifically to FIG. 19, each hook 318 has a general t-shape formed by a base structure 329 and a retaining structure 331. The retaining structure 331 has a first end 333 and a second end 335 for retaining a light string as previously described above. Thus, the first and second ends 333, 335 for a double-hook (single) structure.

Figure 20:
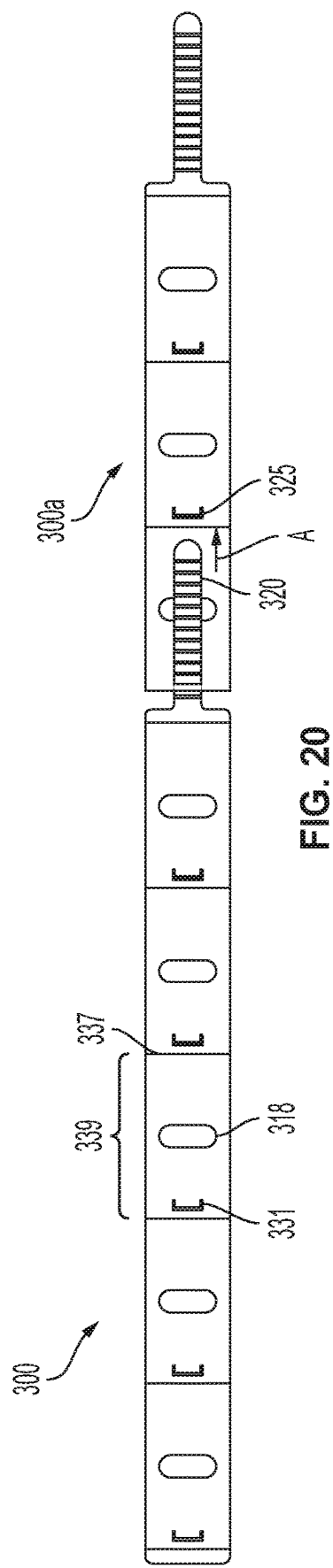
FIG. 20 is a top view illustrating connecting two no wrap straps of FIG. 17.

Referring to FIG. 20, the strap 300 is attached to another strap 300a. Both straps 300, 300a are identical to each other. To attach the straps 300, 300a, the zip tie 320 of the strap 300 is inserted through the tie receiver 325 of the other strap 300a in an attachment direction A.

Optionally, the strap 300 includes trim lines 337 separating repeating sections 339. Each repeating section 339, for example, includes a retaining structure 331 and a hook 318. Optionally yet, the apertures 304 (illustrated in FIG. 17) are removed from the strap 300. When attaching the strap 300 to itself or to another strap 300a, unnecessary sections 339 can be easily removed by trimming the strap 300 along a desired one of the trim lines 337.

Figure 21:
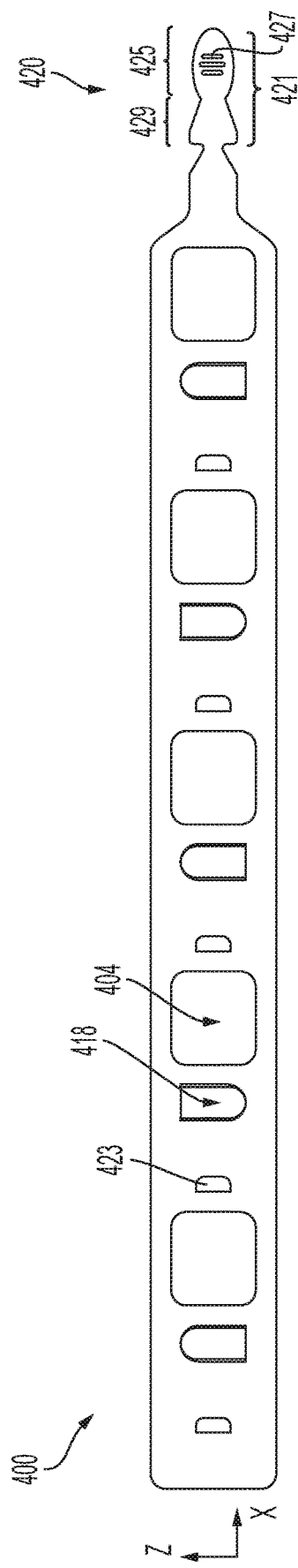
FIG. 21 is a top view of a no wrap strap having a tether configuration, according to another illustrative embodiment of the present disclosure.
Figure 22:
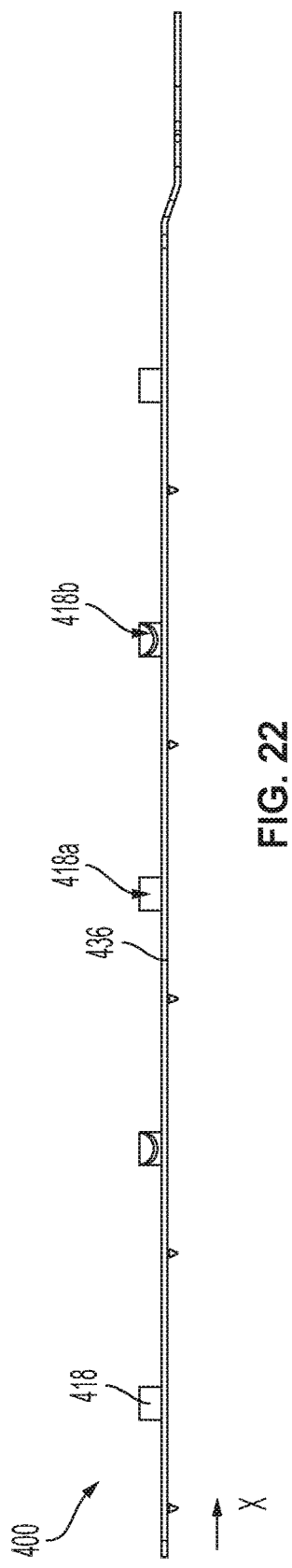
FIG. 22 is a side view of the no wrap strap of FIG. 21.
Figure 23:
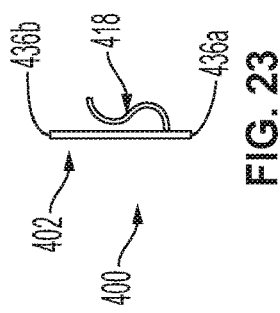
FIG. 23 is a front view of the no wrap strap of FIG. 21.

Referring generally to FIGS. 21-23, a strap 400 is provided in the form of a tether configuration, according to an alternative embodiment of the present disclosure. The zip tie overlap strap 400 is generally similar, but not identical, to the strap 100 described above in reference to FIGS. 1-16, or to any other of the strap embodiments described above. For example, the zip tie overlap strap 400 can have one or more of the features discussed above, except as disclosed below.

Referring specifically to FIG. 21, the tether strap 400 has a securing element 420 that is in the form of a pull-through connection. The pull-through connection 420 has a notched section 421 that is configured to be received within a connection receiver 423 located on a main body 402. The notched section 421 includes a connecting ribbed element 425 that includes a plurality of ribs 427. The connecting ribbed element 425 has a general oval shape end is connected to a leading notch area 429. As more clearly illustrated in FIG. 22, the securing element 420 is offset from the main body 402 along a Z axis.

The main body 402 includes a plurality of connection receivers 423, which are interspersed at equidistant positions between adjacent ones of a plurality of apertures 404 and a plurality of hooks 418. The connection receivers 423 are centrally located along an X axis of the main body 402.

Referring specifically to FIG. 22, the hooks 418 are positioned in an alternating arrangement along the X axis of the main body. For example, a first hook 418a is oriented away from a first external side 436, while a second hook 418b is oriented toward the first external side 436. Other hooks 418 continue this pattern along the main body.

Referring specifically to FIG. 23, each hook 418 is a single-sided hook. The hook 418 is connected to the main body 402 near one of two external sides 436a, 436b. The hook 418 extends in a general s-shape toward the other one of the two external sides 436a, 436b.

Figure 24:
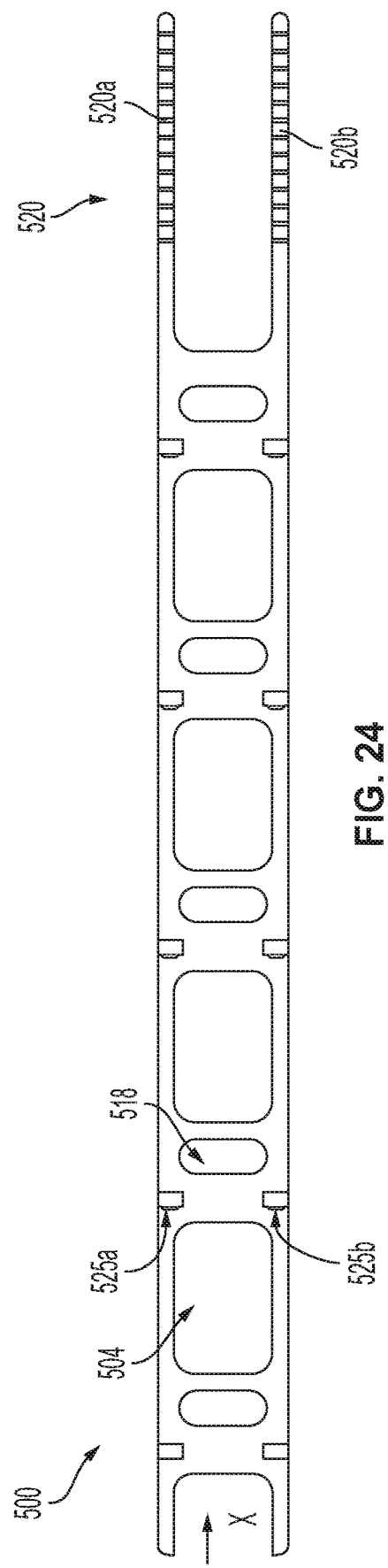
FIG. 24 is a top view of a no wrap strap having a double zip tie overlap configuration, according to another illustrative embodiment of the present disclosure.
Figure 25:
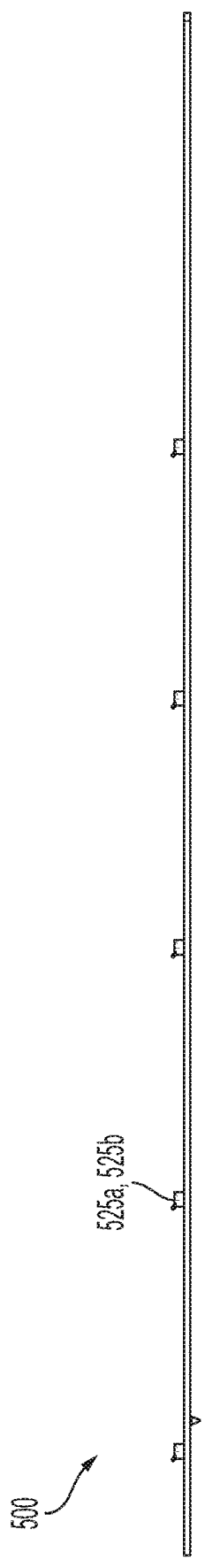
FIG. 25 is a side view of the no wrap strap of FIG. 21.

Referring generally to FIGS. 24 and 25, a strap 500 is provided in the form of a double zip tie overlap configuration, according to an alternative embodiment of the present disclosure. The double zip tie overlap strap 500 is generally similar, but not identical, to the strap 100 described above in reference to FIGS. 1-16, or to any other of the strap embodiments described above. For example, the zip tie overlap strap 500 can have one or more of the features discussed above, except as disclosed below. Furthermore, the zip tie overlap strap 500 is further generally similar, but not identical, to the strap 300 described above in reference to FIGS. 17-20.

Referring specifically to FIG. 24, the double zip tie overlap strap 500 has a securing element 520 that in the form of a double zip tie 520a, 520b. The double zip tie 520a, 520b has a first zip tie 520a that is symmetrical to a second zip tie 520a relative to an X axis. The double zip tie 520a, 520b is received within tie receivers 525a, 525b (also illustrated in FIG. 25), which are located at equidistant positions along a main body 502 between adjacent apertures 504. The tie receivers 525a, 525b are located near double sided hooks 518.

Referring generally to FIGS. 26-28, a strap 600 is provided in the form of a hook configuration, according to an alternative embodiment of the present disclosure. The hook strap 600 is generally similar, but not identical, to the strap 100 described above in reference to FIGS. 1-16, or to any other of the strap embodiments described above. For example, the hook strap 600 can have one or more of the features discussed above, except as disclosed below.

Referring specifically to FIG. 26, the hook strap 600 has a securing element 620 that is in the form of a ribbed tie. The ribbed tie 620 has a plurality of ribs 621 interspersed with a plurality of separating areas 623. The hook strap 600 includes a tie receiver 625 configured for securing the ribbed tie 620 therein. The hook strap 600 further includes a plurality of hook receivers 618 positioned along a main body 602.

Referring specifically to FIG. 27, the hook receivers 618 have a hook hole 619 for receiving a respective hook 621 (illustrated in FIG. 28). The hook receivers 618 have a general semi-circular shape extending from the main body 602 along a Z axis.

Referring specifically to FIG. 28, the hook receiver 618 receives within the hook 621. The hook 621 is a separate component from the hook strap 600. According to an example, the hook 621 is made from a stainless steel material.

Referring to FIGS. 29-31, a strap 700 is provided in the form of a molded hook configuration, according to an alternative embodiment of the present disclosure. The molded hook strap 700 is generally similar, but not identical, to the strap 100 described above in reference to FIGS. 1-16, or to any other of the strap embodiments described above. For example, the molded hook strap 700 can have one or more of the features discussed above, except as disclosed below. Furthermore, the molded hook strap 700 is further generally similar, but not identical, to the hook strap 600 described above in reference to FIGS. 26-28. In contrast to the hook strap 600 (illustrated in FIGS. 26-28), the molded hook strap 700 has hooks 721 that are integrally molded in hook receivers 718.

Figure 32:
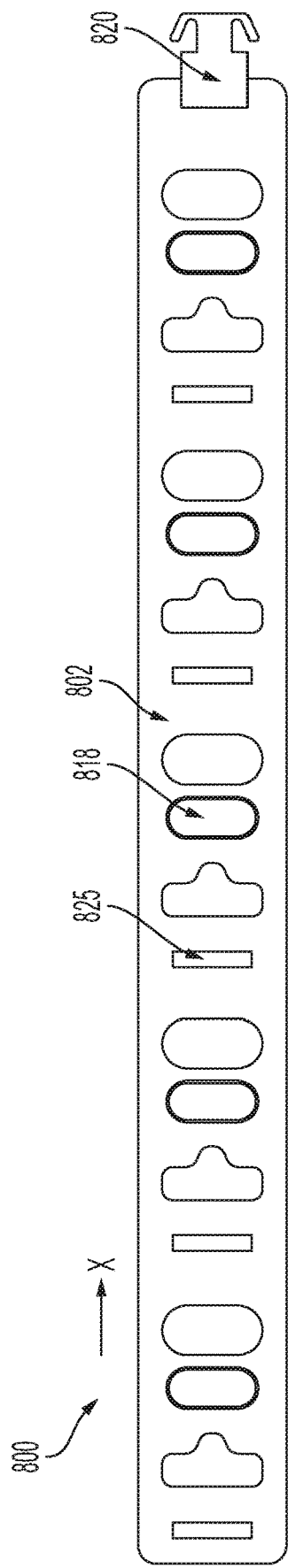
FIG. 32 is a top view of a no wrap strap having a snap clip configuration, according to another illustrative embodiment of the present disclosure.
Figure 33:
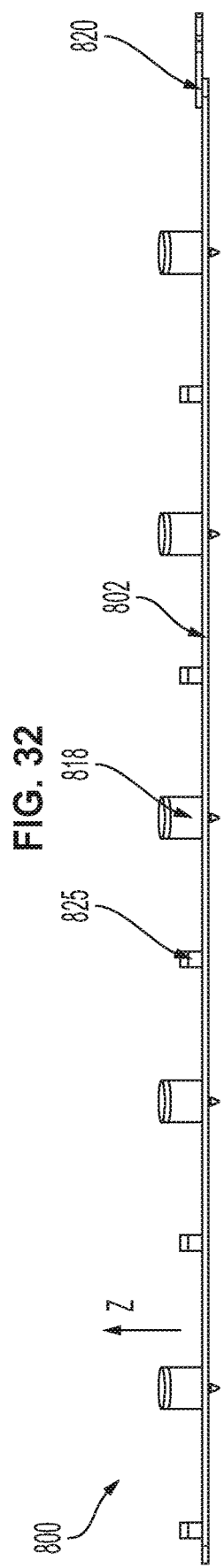
FIG. 33 is a side view of the no wrap strap of FIG. 32.
Figure 34:
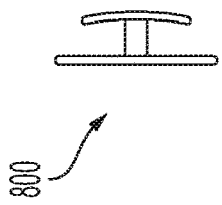
FIG. 34 is a front view of the no wrap strap of FIG. 32.

Referring to FIGS. 32-34, a strap 800 is provided in the form of a snap clip configuration, according to an alternative embodiment of the present disclosure. The snap clip strap 800 is generally similar, but not identical, to the strap 100 described above in reference to FIGS. 1-16, or to any other of the strap embodiments described above. For example, the snap clip strap 800 can have one or more of the features discussed above, except as disclosed below.

Referring specifically to FIGS. 32 and 33, the snap clip strap 800 has a securing element 820 that is in the form of a spring snap connector. The snap clip strap 800 includes a plurality of spring snap receivers 825 configured for securing the spring snap connector 820 therein. The spring snap receivers 825 are positioned at equidistant positions along a main body 802 along an X axis (illustrated in FIG. 32). The spring snap connector 820 is offset from the main body 802 in a Z axis direction (illustrated in FIG. 33). The snap clip strap 800 further includes a plurality of double-sided hooks 818 (more clearly illustrated in FIG. 34), which are similar or identical to the double-sided hooks 318 described in reference to and illustrated in FIGS. 17-19.

Figure 35:
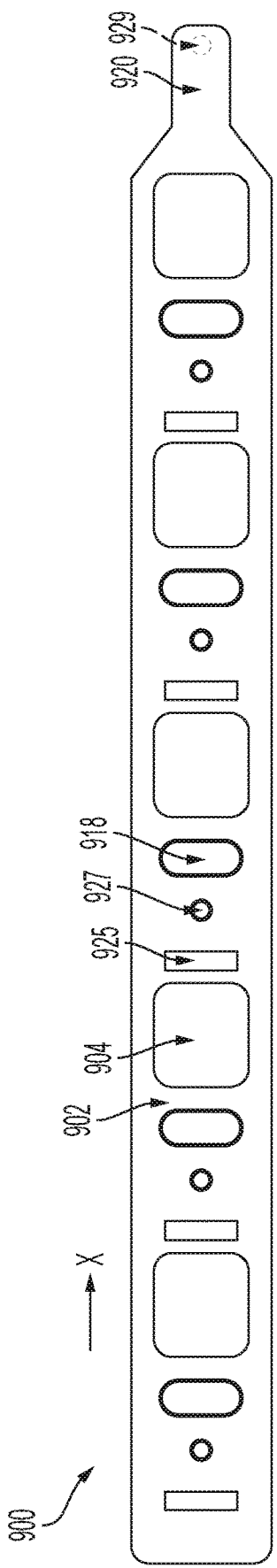
FIG. 35 is a top view of a no wrap strap having a snap through hole configuration, according to another illustrative embodiment of the present disclosure.
Figure 36:
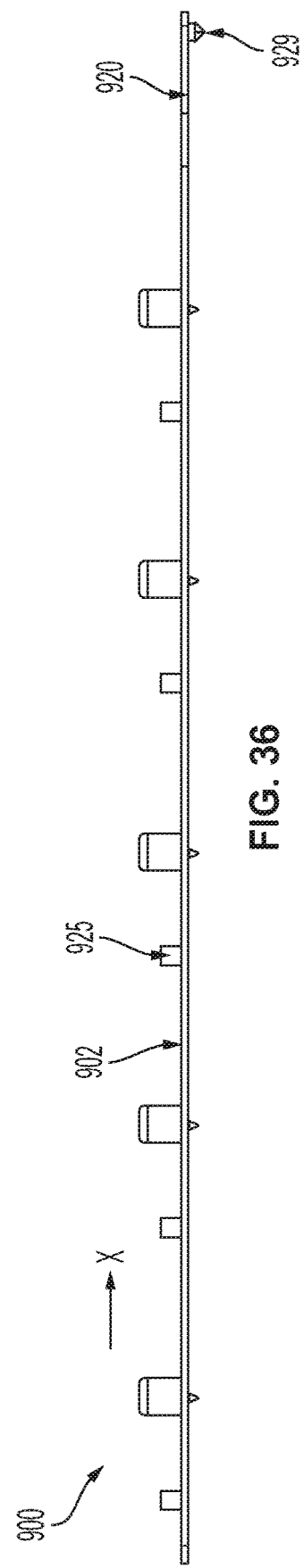
FIG. 36 is a side view of the no wrap strap of FIG. 35.
Figure 37:
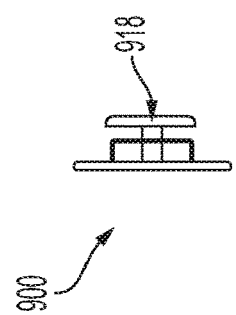
FIG. 37 is a front view of the no wrap strap of FIG. 35.

Referring to FIGS. 35-37, a strap 900 is provided in the form of a snap through hole configuration, according to an alternative embodiment of the present disclosure. The snap through hole strap 900 is generally similar, but not identical, to the strap 100 described above in reference to FIGS. 1-16, or to any other of the strap embodiments described above. For example, the snap through hole strap 900 can have one or more of the features discussed above, except as disclosed below.

Referring specifically to FIGS. 35 and 36, the snap through hole strap 900 has a securing element 920 that is in the form of a button snap connector. The snap through hole strap 900 includes a plurality of strap lock slots 925 and a plurality of snap hole connectors 927 (illustrated only in FIG. 35). A respective strap lock slot 925 is positioned adjacent to a snap hole connector 927 along an X axis of a main body 902. When inserted, a protruding button 929 of the securing element 920 is snapped into a respective snap hole connector 927. The securing element 920 is inserted through a respective strap lock slot 925, before snapping into the respective snap hole connector 927. As illustrated in FIG. 35, pairs of adjacent strap lock slots 925 and snap hole connectors 927 are positioned between a respective aperture 904 and a respective single-sided hook 918 (which is more clearly illustrated in FIG. 37).

Figure 38:
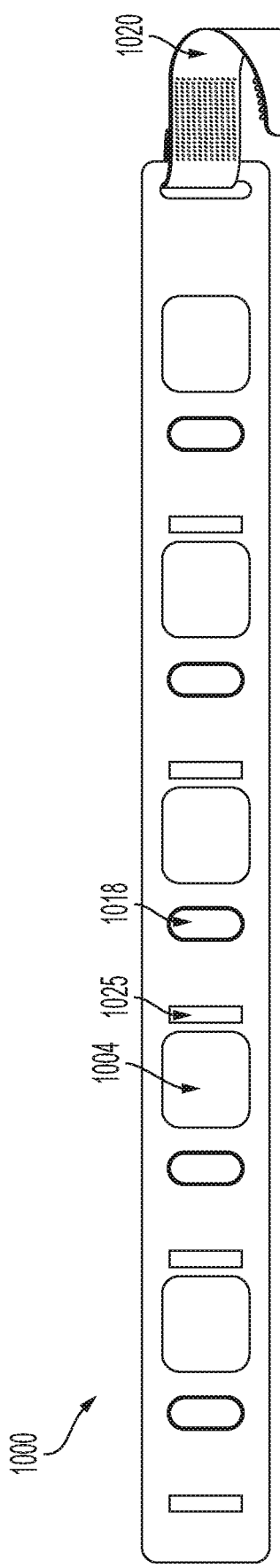
FIG. 38 is a top view of a no wrap strap having a hook and loop configuration, according to another illustrative embodiment of the present disclosure.
Figure 39:
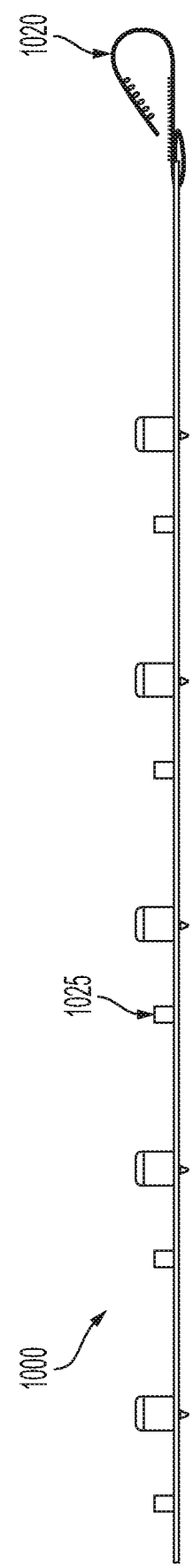
FIG. 39 is a side view of the no wrap strap of FIG. 38.
Figure 40:
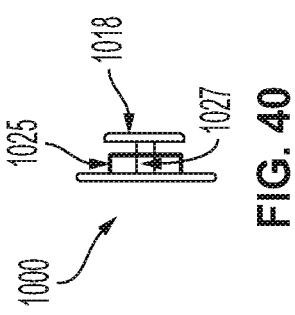
FIG. 40 is a front view of the no wrap strap of FIG. 38.
Figure 41:
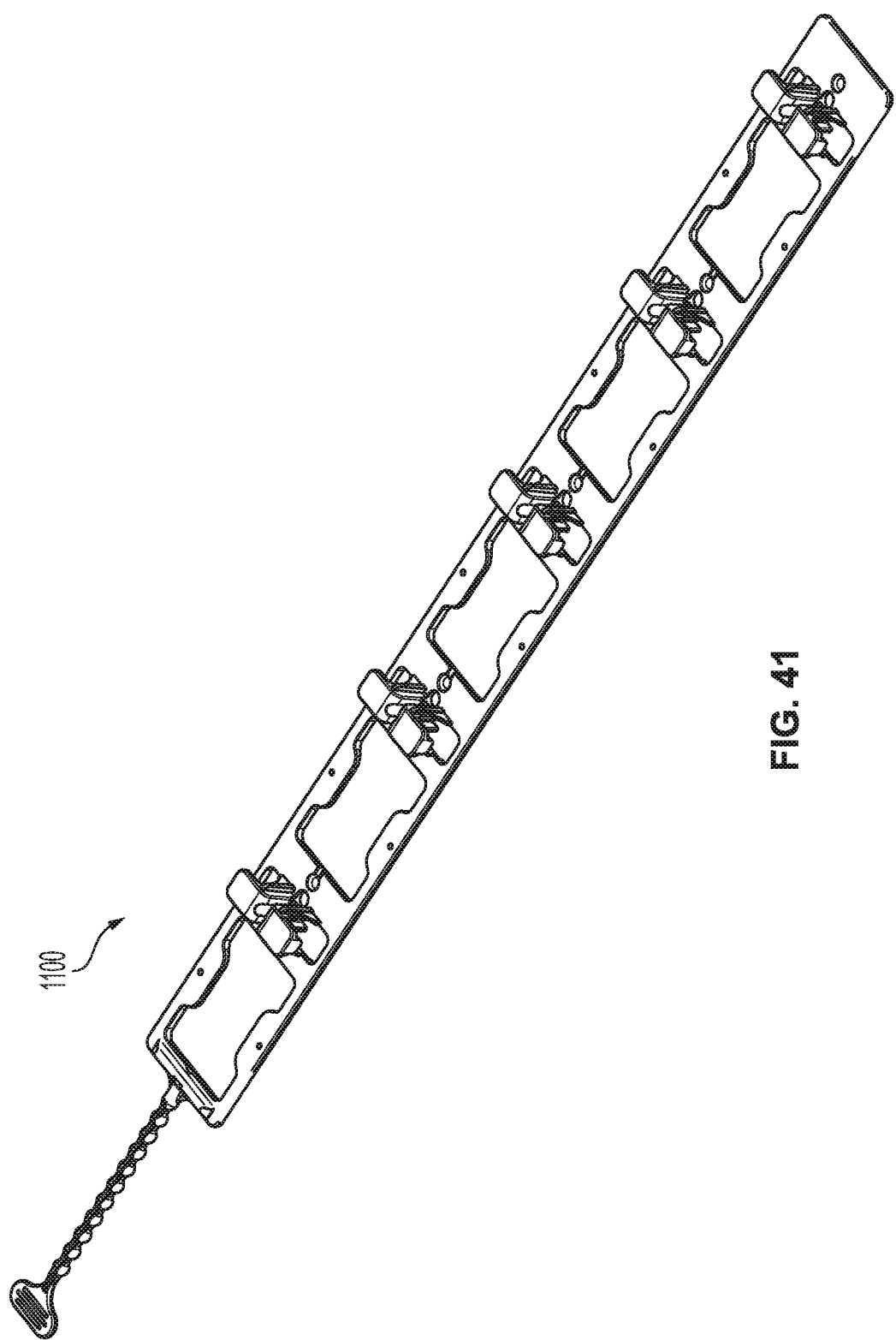
FIG. 41 is a perspective view of another a no wrap strap having a reinforced configuration, according to another illustrative embodiment of the present disclosure.

Referring generally to FIGS. 38-40, a strap 1000 is provided in the form of a hook and loop configuration, according to an alternative embodiment of the present disclosure. The hook and loop strap 1000 is generally similar, but not identical, to the strap 100 described above in reference to FIGS. 1-16, or to any other of the strap embodiments described above. For example, the hook and loop strap 1000 can have one or more of the features discussed above, except as disclosed below.

Referring specifically to FIGS. 38 and 39, the hook and loop strap 1000 has a securing element 1020 that is in the form of a hook and loop strap element. The hook and loop strap 1000 includes a plurality of strap cinch tabs 1025 (more clearly also illustrated in FIG. 40. When inserted, the hook and loop securing element 1020 is looped through and hooked to a respective strap cinch tab 1025. The strap cinch tabs 1025 are positioned between a respective aperture 1004 and a respective single-sided hook 1018 (which is more clearly illustrated in FIG. 40). As illustrated in FIG. 40, each strap cinch tab 1025 has a general rectangular shape with a receiving hole 1027 for receiving within a respective hook and loop securing element 1020 (illustrated in FIGS. 38 and 39).

Referring generally to FIGS. 41-44, a strap 1100 is provided with a reinforced configuration, according to an alternative embodiment of the present disclosure. The reinforced strap 1100 is generally similar, but not identical, to the strap 100 described above in reference to FIGS. 1-16, or to any other of the strap embodiments described above. For example, the reinforced strap 1100 can have one or more of the features discussed above, except as disclosed below.

Figure 42:
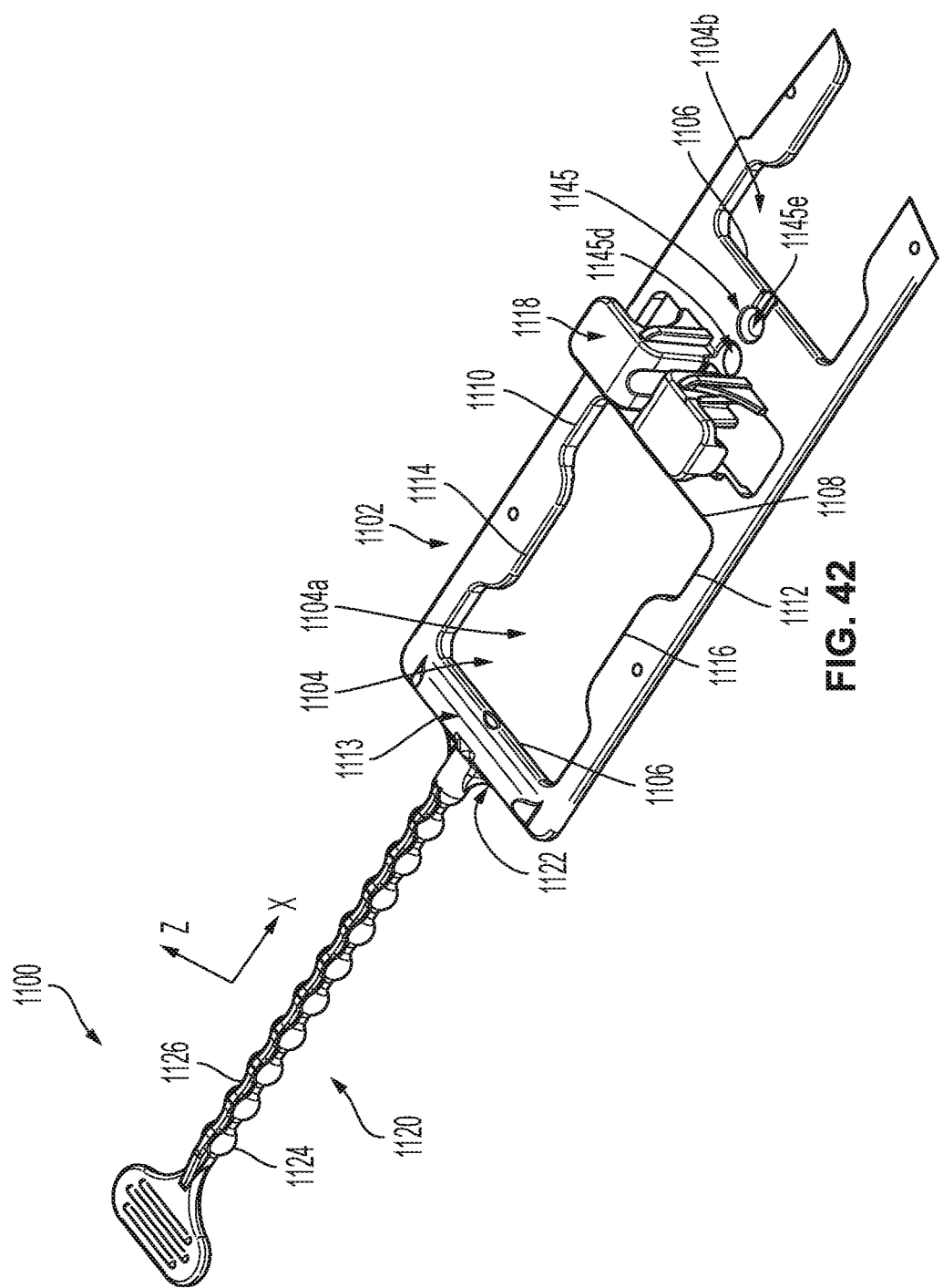
FIG. 42 is a perspective view of a securing element area of the no wrap strap of FIG. 41.
Figure 43:
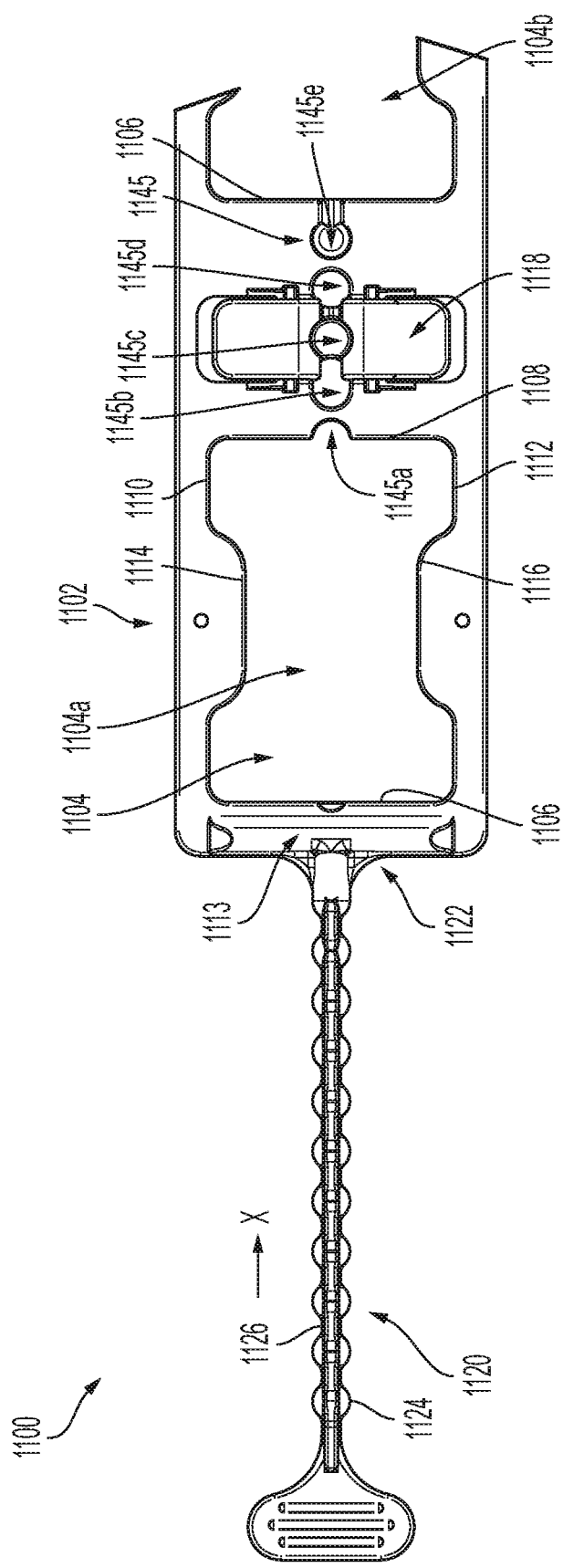
FIG. 43 is a top view of the securing element area of FIG. 42.

Referring more specifically to FIGS. 42 and 43, a main body 1102 has apertures 1104 that have a rectangular bone shape (instead of a circular bone shape disclosed in FIG. 1). Each aperture 1104 has a general rectangular periphery that includes first and second outer sides 1110, 1112, which have a general straight, non-circular profile. The first and second outer sides 1110, 1112, extend along an X axis between first and second longitudinal sides 1106, 1108. First and second inner sides 1114, 116 extend inwardly, relative to respective ones of first and second outer sides 1110, 1112.

A reinforcement rib 1113 extends along a Z axis (illustrated in FIG. 42) from a planar surface of the main body 1102, being positioned near a securing end 1122 of the main body 1102. The reinforcement rib 1113 provide enhanced support between the securing end 1122 and a securing element 1120.

The securing element 1120 includes a plurality of securing balls 1124 that are arranged along a securing string 1126. According to this example, ten securing balls 1124 are included on the securing string 1126, with a higher density than (for example) the number of securing balls 124 illustrated in FIG. 1 (which shows four securing balls 124).

To accommodate the increased number of securing balls 1124, the main body 102 includes a plurality of holes 1145. The holes 1145 includes a partial hole 1145a (illustrated only in FIG. 43) along a second longitudinal side 1108 of a first aperture 1104a. The holes 1145 include three holes 1145b-1145d (holes 1145b and 1145c only illustrated in FIG. 43) positioned symmetrically between a pair of hooks 1118. Yet another hole 1145e is positioned adjacent a first longitudinal side 1106 of a second aperture 1104b. The holes 1145 accommodate receiving the securing balls 1124 when attaching the securing end 1122 (of the same or different reinforced strap 1100).

Figure 44:
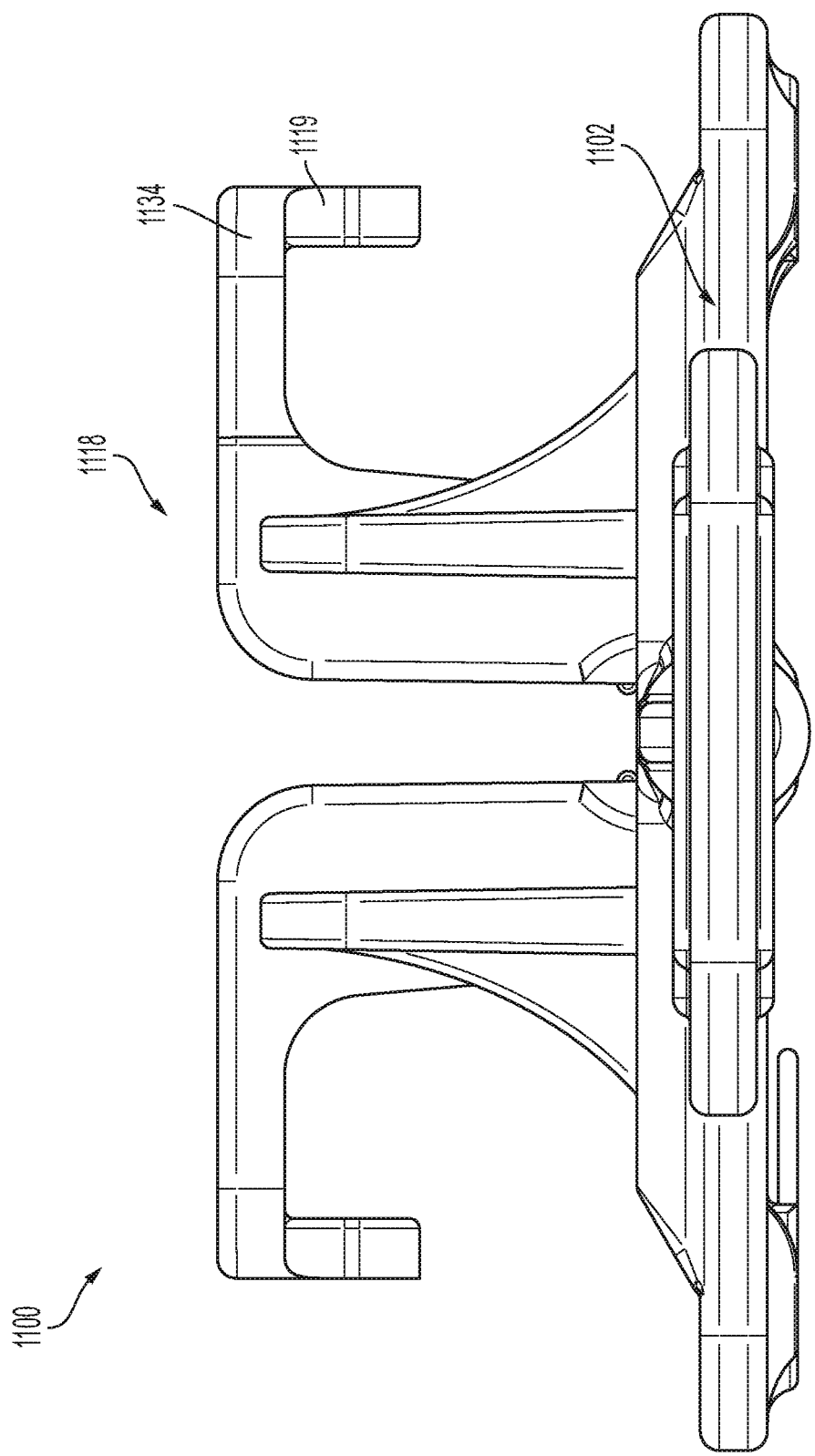
FIG. 44 is a front view of the no wrap strap of FIG. 41.

Referring more specifically to FIG. 44, the hooks 1118 have a light string retainer 1119 that extends from a top end 1134. The light string retainer 1119 extends perpendicularly towards the main body 1102. When attaching a light string, such as the light string 206 illustrated in FIG. 10, the light string retainer 1119 advantageously helps retain in place the light string relative to the reinforced strap 1100. Optionally, the reinforced strap 1100 has no spikes, such as spikes 127 illustrated in FIG. 2.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A method for holding light bulbs, the method comprising:
   providing a plurality of no wrap straps including a first strap and a second strap, each strap of the plurality of no wrap straps having a plurality of pairs of hanging hooks extending from a main body, each strap of the plurality of no wrap straps further having a securing element integrally attached to and extending from the main body with a plurality of securing balls arranged along a securing string;
   securing the first strap along a circumference of a fixed structure by inserting the securing string in a recession between one of the plurality of pairs of hanging hooks such that two adjacent balls of the plurality of securing balls are outside the recession but next to the one of the plurality of pairs;
   securing the second strap along the circumference of the fixed structure similar to the securing of the first strap, the second strap being spaced from the first strap along a length of the fixed structure;
   arranging one or more string sections of a light string between the first strap and the second strap, each of the one or more string sections extending straight along the length of the fixed structure between the first strap and the second strap in a no wrap configuration.

2. The method of claim 1, wherein the no wrap configuration is a vertical diagonal wrap configuration in which a top end of one string section of the one or more string sections is generally vertical with a bottom end of the one string section.

3. The method of claim 1, wherein the no wrap configuration is a vertical straight wrap configuration in which a top end of one string section of the one or more string sections is generally offset vertically relative to a bottom end of the one string section.

4. The method of claim 1, wherein the one or more string sections include a first string section that has a top end and a bottom end, the top end being wrapped around a first top hook of the first strap, the bottom end being wrapped around a first bottom hook of the second strap.

5. The method of claim 4, wherein the one or more string sections include a second string section that has a top end and a bottom end, the top end of the second string begin wrapped around a second top hook of the first strap, the bottom end of the second string section being wrapped around a second bottom hook of the second strap.

6. The method of claim 5, wherein the first top hook is adjacent to and offset from the second top hook, the first bottom hook being adjacent to and offset from the second bottom hook.

7. The method of claim 1, further comprising removing at least one of the provided plurality of no wrap straps from the plurality of no wrap straps or adding at least a further one no wrap strap to the provided plurality of no wrap straps to tightly hug the circumference of the fixed structure without slipping therefrom.

* * * * *